(12) United States Patent
Matsuo

(10) Patent No.: US 8,284,668 B2
(45) Date of Patent: Oct. 9, 2012

(54) PACKET TRANSMISSION APPARATUS, LINE INTERFACE UNIT, AND CONTROL METHOD FOR PACKET TRANSMISSION APPARATUS

(75) Inventor: Tamotsu Matsuo, Osaka (JP)

(73) Assignee: Fujitsu Limited, Kawasaki (JP)

( * ) Notice: Subject to any disclaimer, the term of this patent is extended or adjusted under 35 U.S.C. 154(b) by 349 days.

(21) Appl. No.: 12/710,354

(22) Filed: Feb. 22, 2010

(65) Prior Publication Data
US 2010/0238941 A1 Sep. 23, 2010

(30) Foreign Application Priority Data

Mar. 19, 2009 (JP) ................................. 2009-068491

(51) Int. Cl.
*H04L 12/26* (2006.01)
*H04L 12/28* (2006.01)
(52) U.S. Cl. ........................................ 370/235; 370/412
(58) Field of Classification Search ....... 370/235–236.2, 370/412–418
See application file for complete search history.

(56) References Cited

U.S. PATENT DOCUMENTS

| | | | | |
|---|---|---|---|---|
| 6,122,251 A * | 9/2000 | Shinohara | ...................... | 370/231 |
| 6,259,698 B1 * | 7/2001 | Shin et al. | .................. | 370/395.7 |
| 6,377,546 B1 | 4/2002 | Guerin | | |
| 6,388,993 B1 * | 5/2002 | Shin et al. | ...................... | 370/233 |
| 6,731,644 B1 * | 5/2004 | Epps et al. | ..................... | 370/412 |
| 7,058,070 B2 * | 6/2006 | Tran et al. | ...................... | 370/412 |
| 7,085,269 B2 * | 8/2006 | Sano | ............................. | 370/390 |
| 7,161,906 B2 * | 1/2007 | Dell et al. | ..................... | 370/231 |
| 7,724,733 B2 * | 5/2010 | Benner et al. | .................. | 370/389 |
| 2009/0016350 A1 | 1/2009 | Matsuo | | |
| 2009/0290593 A1 * | 11/2009 | Du et al. | ....................... | 370/417 |

FOREIGN PATENT DOCUMENTS

| | | |
|---|---|---|
| JP | H10-145382 A | 9/2000 |
| JP | 2000-49853 A | 4/2002 |
| JP | 2009-21872 A | 1/2009 |

\* cited by examiner

*Primary Examiner* — Hong Cho
(74) *Attorney, Agent, or Firm* — Fujitsu Patent Center

(57) ABSTRACT

A packet transmission apparatus includes: a plurality of communication ports; a switch for switching packets; a storage unit which stores a plurality of queues for respectively holding packets to be output from the plurality of communication ports; and a stop signal generating unit. The stop signal generating unit generates a stop signal for stopping packets directed to one of the communication ports from being input into the switch, if the amount of packets held in the queue for the one communication port is equal to or larger than a certain first threshold value, and if the sum of the amounts of packets held in the plurality of queues is equal to or larger than a certain second threshold value.

7 Claims, 32 Drawing Sheets

FIG. 3
(A)
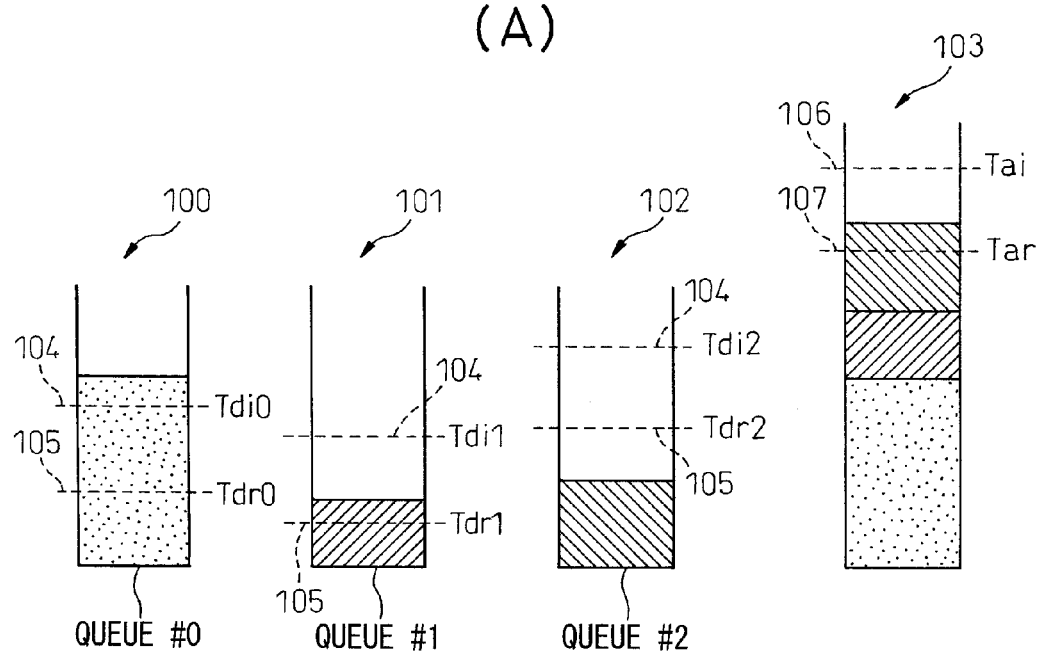
(B)
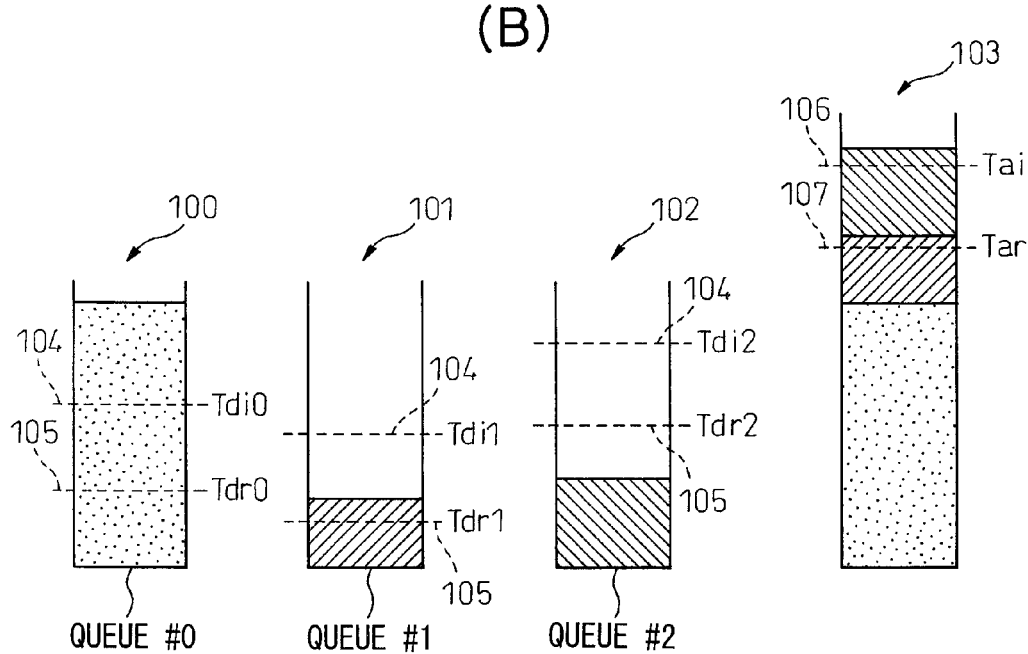

FIG.4
(A)
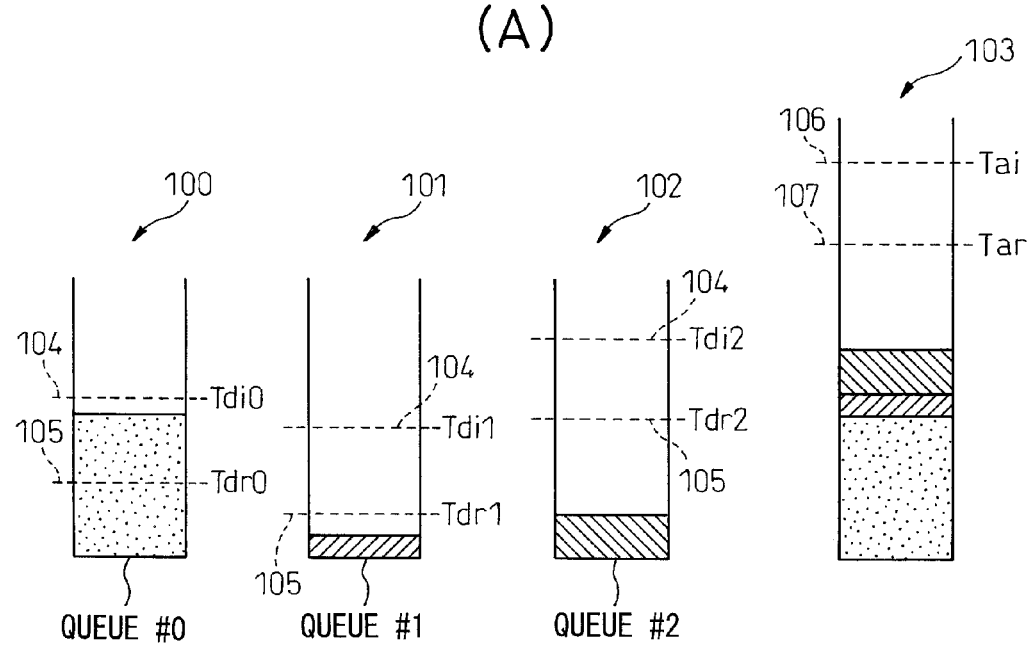
(B)
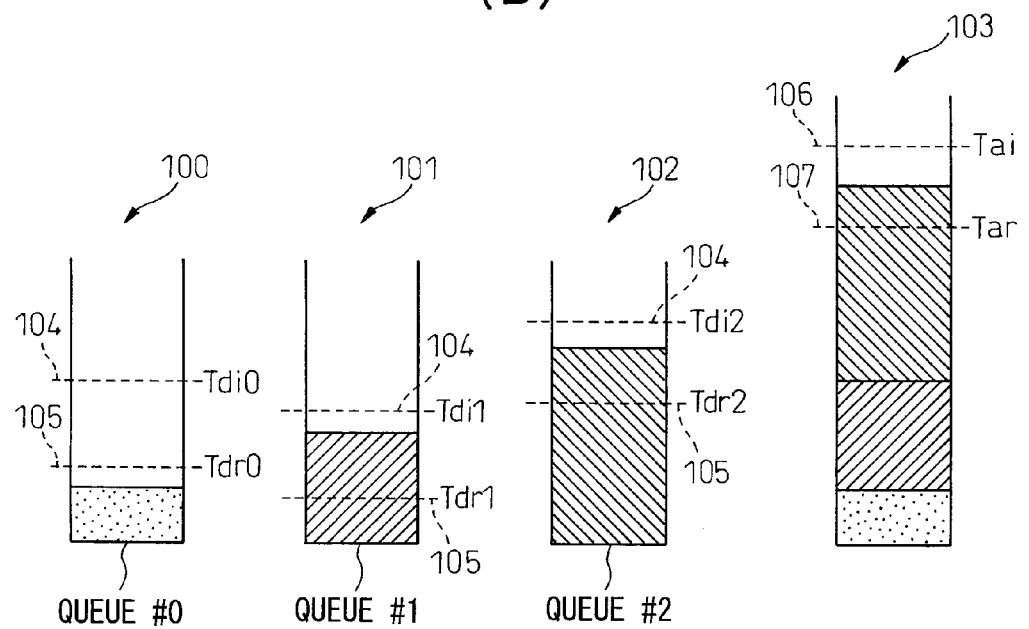

| ADDRESS | DATA | |
|---|---|---|
| 0 | BP ISSUE THRESHOLD VALUE Tdi0 FOR QUEUE #0 | BP RELEASE THRESHOLD VALUE Tdr0 FOR QUEUE #0 |
| 1 | BP ISSUE THRESHOLD VALUE Tdi1 FOR QUEUE #1 | BP RELEASE THRESHOLD VALUE Tdr1 FOR QUEUE #1 |
| 2 | BP ISSUE THRESHOLD VALUE Tdi2 FOR QUEUE #2 | BP RELEASE THRESHOLD VALUE Tdr2 FOR QUEUE #2 |
| ⋮ | ⋮ | ⋮ |
| ⋮ | ⋮ | ⋮ |
| n | BP ISSUE THRESHOLD VALUE Tdin FOR QUEUE #n | BP RELEASE THRESHOLD VALUE Tdrn FOR QUEUE #n |
| n+1 | GLOBAL BP ISSUE THRESHOLD VALUE Tai | GLOBAL BP RELEASE THRESHOLD VALUE Tar |

FIG.6

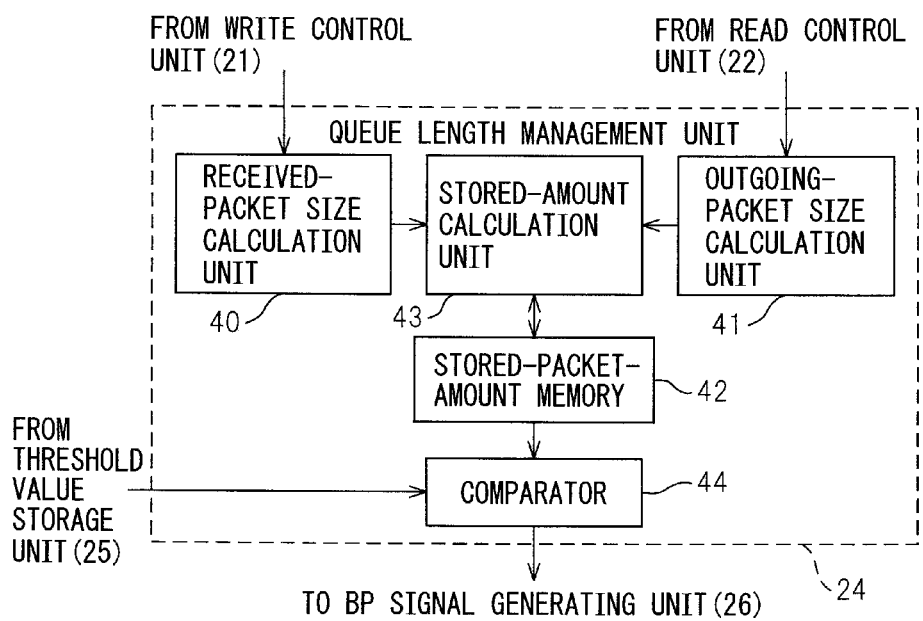

| ADDRESS | DATA |
|---|---|
| 0 | STORED AMOUNT IN QUEUE #0 |
| 1 | STORED AMOUNT IN QUEUE #1 |
| 2 | STORED AMOUNT IN QUEUE #2 |
| ⋮ | ⋮ |
| ⋮ | ⋮ |
| n | STORED AMOUNT IN QUEUE #n |
| n+1 | TOTAL PACKET AMOUNT |

FIG.10
(A)
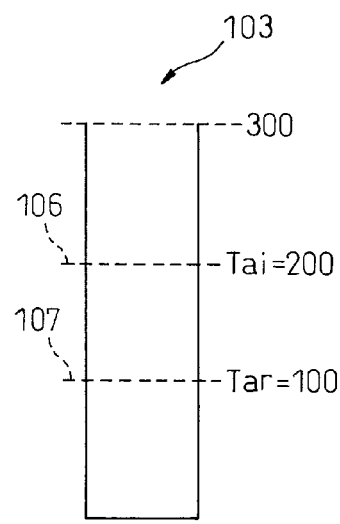
(B)
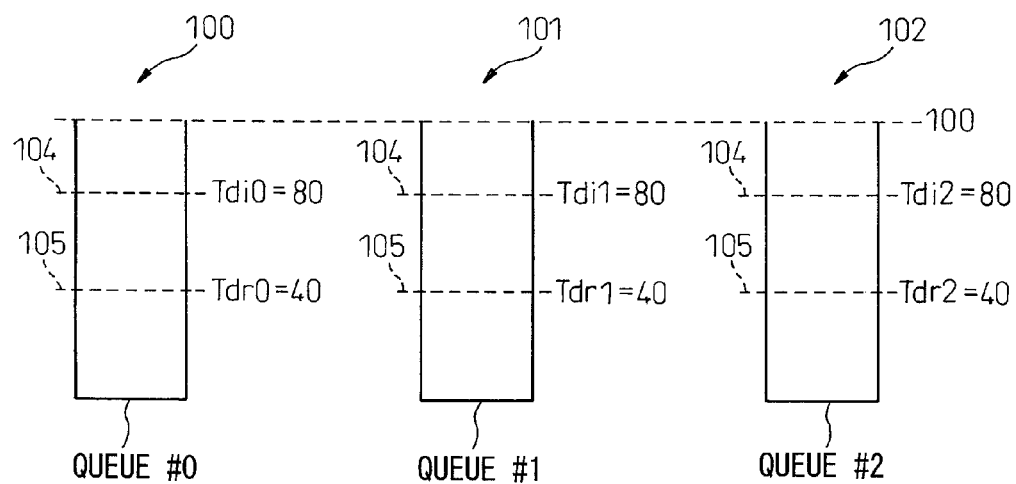

| ADDRESS | DATA |
|---|---|
| 0 | PACKET |
| 1 | PACKET |
| 2 | PACKET |
| ⋮ | ⋮ |
| m-2 | PACKET |
| m-1 | PACKET |
| m | PACKET |

| ADDRESS | DATA |
|---|---|
| 0 | NEXT ADDRESS VALUE OR NEXT FREE ADDRESS VALUE |
| 1 | NEXT ADDRESS VALUE OR NEXT FREE ADDRESS VALUE |
| 2 | NEXT ADDRESS VALUE OR NEXT FREE ADDRESS VALUE |
| ⋮ | ⋮ |
| m−2 | NEXT ADDRESS VALUE OR NEXT FREE ADDRESS VALUE |
| m−1 | NEXT ADDRESS VALUE OR NEXT FREE ADDRESS VALUE |
| m | NEXT ADDRESS VALUE OR NEXT FREE ADDRESS VALUE |

| ADDRESS | DATA |
|---|---|
| 0 | STORAGE ADDRESS VALUE FOR START PACKET DIRECTED TO PHYSICAL PORT P#0 |
| 1 | STORAGE ADDRESS VALUE FOR START PACKET DIRECTED TO PHYSICAL PORT P#1 |
| 2 | STORAGE ADDRESS VALUE FOR START PACKET DIRECTED TO PHYSICAL PORT P#2 |
| ⋮ | ⋮ |
| n | STORAGE ADDRESS VALUE FOR START PACKET DIRECTED TO PHYSICAL PORT P#n |
| n+1 | START ADDRESS VALUE OF FREE SPACE |

122

| ADDRESS | DATA |
|---|---|
| 0 | STORAGE ADDRESS VALUE FOR END PACKET DIRECTED TO PHYSICAL PORT P#0 |
| 1 | STORAGE ADDRESS VALUE FOR END PACKET DIRECTED TO PHYSICAL PORT P#1 |
| 2 | STORAGE ADDRESS VALUE FOR END PACKET DIRECTED TO PHYSICAL PORT P#2 |
| ⋮ | ⋮ |
| n | STORAGE ADDRESS VALUE FOR END PACKET DIRECTED TO PHYSICAL PORT P#n |
| n+1 | END ADDRESS VALUE OF FREE SPACE |

| ADDRESS | DATA |
|---|---|
| 0 | READ ADDRESS VALUE |
| 1 | READ ADDRESS VALUE |
| 2 | READ ADDRESS VALUE |
| ⋮ | ⋮ |
| x-2 | READ ADDRESS VALUE |
| x-1 | READ ADDRESS VALUE |
| x | READ ADDRESS VALUE |

FIG.25A
OUTPUT PACKET BUFFER 5

| ADDRESS | DATA |
|---|---|
| 0 | FREE |
| 1 | FREE |
| 2 | FREE |
| 3 | FREE |
| 4 | FREE |
| 5 | FREE |
| 6 | FREE |
| 7 | FREE |
| 8 | FREE |
| 9 | FREE |
| : | : |
| : | : |
| n-2 | FREE |
| n-1 | FREE |
| n | FREE |

FIG.25B
CHAIN MANAGEMENT TABLE 120

| ADDRESS | DATA |
|---|---|
| 0 | NEXT FREE ADDRESS=1 |
| 1 | NEXT FREE ADDRESS=2 |
| 2 | NEXT FREE ADDRESS=3 |
| 3 | NEXT FREE ADDRESS=4 |
| 4 | NEXT FREE ADDRESS=5 |
| 5 | NEXT FREE ADDRESS=6 |
| 6 | NEXT FREE ADDRESS=7 |
| 7 | NEXT FREE ADDRESS=8 |
| 8 | NEXT FREE ADDRESS=9 |
| 9 | NEXT FREE ADDRESS=10 |
| : | : |
| : | : |
| n-2 | NEXT FREE ADDRESS=n-1 |
| n-1 | NEXT FREE ADDRESS=n |
| n | NEXT FREE ADDRESS=NONE |

FIG.25C
START ADDRESS MANAGEMENT TABLE 121

| ADDRESS | DATA |
|---|---|
| 0 | START ADDRESS=NONE |
| 1 | START ADDRESS=NONE |
| 2 | START ADDRESS=NONE |
| : | : |
| : | : |
| : | |
| : | |
| n+1 | START ADDRESS=0 |

FIG.25D
END ADDRESS MANAGEMENT TABLE 122

| ADDRESS | DATA |
|---|---|
| 0 | END ADDRESS=NONE |
| 1 | END ADDRESS=NONE |
| 2 | END ADDRESS=NONE |
| : | : |
| : | : |
| : | |
| : | |
| n+1 | END ADDRESS=n |

FIG.35

PACKET OUTPUT  →

CHAIN MANAGEMENT TABLE 120

| ADDRESS | DATA |
|---|---|
| 0 | NEXT FREE ADDRESS=NONE |
| 1 | NEXT ADDRESS=6 |
| 2 | NEXT ADDRESS=4 |
| 3 | NEXT ADDRESS=5 |
| 4 | NEXT ADDRESS=7 |
| 5 | NEXT ADDRESS=NONE |
| 6 | NEXT ADDRESS=8 |
| 7 | NEXT ADDRESS=NONE |
| 8 | NEXT ADDRESS=NONE |
| 9 | NEXT FREE ADDRESS=10 |
| ... | ... |
| n-2 | NEXT FREE ADDRESS=n-1 |
| n-1 | NEXT FREE ADDRESS=n |
| n | NEXT FREE ADDRESS=0 |

END ADDRESS MANAGEMENT TABLE 122

| ADDRESS | DATA |
|---|---|
| 0 | END ADDRESS=5 |
| 1 | END ADDRESS=8 |
| 2 | END ADDRESS=7 |
| ... | ... |
| n+1 | END ADDRESS=0 |

OUTPUT PACKET BUFFER 5

| ADDRESS | DATA |
|---|---|
| 0 | FREE |
| 1 | B1 |
| 2 | C1 |
| 3 | A2 |
| 4 | C2 |
| 5 | A3 |
| 6 | B2 |
| 7 | C3 |
| 8 | B3 |
| 9 | FREE |
| ... | ... |
| n-2 | FREE |
| n-1 | FREE |
| n | FREE |

START ADDRESS MANAGEMENT TABLE 121

| ADDRESS | DATA |
|---|---|
| 0 | START ADDRESS=3 |
| 1 | START ADDRESS=1 |
| 2 | START ADDRESS=2 |
| ... | ... |
| n+1 | START ADDRESS=9 |

FIG.36

PACKET OUTPUT 

CHAIN MANAGEMENT TABLE 120

| ADDRESS | DATA |
|---|---|
| 0 | NEXT FREE ADDRESS=3 |
| 1 | NEXT ADDRESS=6 |
| 2 | NEXT ADDRESS=4 |
| 3 | NEXT FREE ADDRESS=NONE |
| 4 | NEXT ADDRESS=7 |
| 5 | NEXT ADDRESS=NONE |
| 6 | NEXT ADDRESS=8 |
| 7 | NEXT ADDRESS=NONE |
| 8 | NEXT ADDRESS=NONE |
| 9 | NEXT FREE ADDRESS=10 |
| ... | ... |
| n-2 | NEXT FREE ADDRESS=n-1 |
| n-1 | NEXT FREE ADDRESS=n |
| n | NEXT FREE ADDRESS=0 |

END ADDRESS MANAGEMENT TABLE 122

| ADDRESS | DATA |
|---|---|
| 0 | END ADDRESS=5 |
| 1 | END ADDRESS=8 |
| 2 | END ADDRESS=7 |
| ... | ... |
| n+1 | END ADDRESS=3 |

OUTPUT PACKET BUFFER 5

| ADDRESS | DATA |
|---|---|
| 0 | FREE |
| 1 | B1 |
| 2 | C1 |
| 3 | FREE |
| 4 | C2 |
| 5 | A3 |
| 6 | B2 |
| 7 | C3 |
| 8 | B3 |
| 9 | FREE |
| ... | ... |
| n-2 | FREE |
| n-1 | FREE |
| n | FREE |

START ADDRESS MANAGEMENT TABLE 121

| ADDRESS | DATA |
|---|---|
| 0 | START ADDRESS=5 |
| 1 | START ADDRESS=1 |
| 2 | START ADDRESS=2 |
| ... | ... |
| n+1 | START ADDRESS=9 |

PACKET TRANSMISSION APPARATUS, LINE INTERFACE UNIT, AND CONTROL METHOD FOR PACKET TRANSMISSION APPARATUS

CROSS-REFERENCE TO RELATED APPLICATIONS

This application is based upon and claims the benefit of priority of the prior Japanese Patent Application No. 2009-68491, filed on Mar. 19, 2009, the entire contents of which are incorporated herein by reference.

FIELD

The embodiments discussed herein are related to a packet transmission apparatus and packet transmission method for switching packets between a plurality of communication ports.

BACKGROUND

Conventionally, in a packet communication network for transmitting packets, a packet transmission apparatus is provided that is equipped with a plurality of communication ports and that switches packets between the plurality of communication ports. One example of such a packet transmission apparatus is a layer 2 switch. When a packet is received via a communication port, the packet transmission apparatus reads the destination address of the packet and determines the outgoing communication port to which the packet is to be transferred. The received packet is transferred to the thus determined outgoing communication port from which the packet is transmitted out. In the following description, the communication port from which the packet is transmitted out may sometimes be referred to simply as the "output port".

Each packet is temporarily stored in an output packet buffer before it is transmitted out from the output port. A scheduler in the packet transmission apparatus performs transmission control according to the priority class of each packet and the transmission rate of each output port. Then, each packet to be transferred to a designated communication port is read out of the output packet buffer and directed to that communication port for output.

In the prior art, there is proposed a rate guarantee method that provides rate guarantees to individual flows through the use of a prescribed buffer management scheme. This method is intended to eliminate dependency on the number of flows in packet transmission decisions while further minimizing overall complexity, even in the presence of excess traffic from other flows.

This method provides an explicit rate guarantee Rn for each of a plurality of packet streams n, wherein each stream n is indexed in the range 1 to N and is multiplexed for transmission on a common output link j in a packet switched network, the link including a buffer having a total buffer space in bytes for storing the packets.

This method includes the steps of: a) for each currently received packet, identifying the packet stream n associated with the currently received packet; b) adding the currently received packet to an occupied portion of the total buffer space to yield a first sum; c) determining whether the first sum exceeds a first threshold and setting a first variable in response thereto; d) adding the currently received packet to an occupied portion of the buffer space allocated to the stream n to yield a second sum; e) determining whether the second sum exceeds a second threshold and setting a second variable in response thereto; and f) accepting or rejecting the packet based upon the first and second variables, whereby the rate guarantee Rn for the stream is assured.

There is also a proposed switch control circuit for an ATM switch that switches each incoming ATM cell from an input port to an output port for transmission in an asynchronous transfer mode. The switch control circuit includes an input port buffer and output port buffer, provided for the input port and output port, respectively, for performing ATM cell switching between the input port and the output port, a back-pressure function for outputting a transmission resume signal, a transmission stop signal, or a transmission control signal, whichever signal is selected based on the amount of occupied space in the output port buffer, in order to prevent cell discarding in the output port buffer, and a cell transmission control means.

The cell transmission control means performs control so that when the transmission resume signal is issued from the back-pressure function for the output port to which the ATM cell is to be transmitted, the ATM cell is transmitted to the output port at a certain first rate, but when the transmission control signal is issued from the back-pressure function for the output port to which the ATM cell is to be transmitted, the ATM cell is transmitted to the output port at a certain second rate.

There is further a proposed packet transmission apparatus that includes a first means which, when writing a received packet to a packet buffer, stores its address in a first storage unit as a read address for each destination corresponding to a physical port and also stores received packet information for the received packet, a second means which, when reading the received packet from the packet buffer in accordance with scheduling control, reads the first storage unit to retrieve the read address of the destination specified in the received packet information and holds the read address in a second storage unit, and a third means which retrieves the read address from the second storage unit in accordance with arbitration control and reads out the corresponding received packet from the packet buffer.

Related art is disclosed in Japanese Unexamined Patent Publication No. 2000-49853, Japanese Unexamined Patent Publication No. H10-145382, and Japanese Unexamined Patent Publication No. 2009-21872.

SUMMARY

According to one embodiment, a packet transmission apparatus is provided, which includes: a plurality of communication ports; a switch for switching packets between the plurality of communication ports; a storage unit which stores a plurality of queues for respectively holding packets to be output from the plurality of communication ports; and a stop signal generating unit. The stop signal generating unit generates a stop signal for stopping packets directed to one of the communication ports from being input into the switch, if the amount of packets held in the queue for the one communication port is equal to or larger than a certain first threshold value, and if the sum of the amounts of packets held in the plurality of queues is equal to or larger than a certain second threshold value.

According to another embodiment, a line interface unit is provided, which provides a packet transmission apparatus having a switch for switching packets between a plurality of lines, and which performs interface control for the packets between the lines and the switch. The line interface unit includes: a plurality of communication ports connected to the plurality of lines; a storage unit which stores a plurality of queues for respectively holding packets to be output from the plurality of communication ports; and a stop signal generating unit. The stop signal generating unit generates a stop signal for stopping packets directed to one of the communication ports from being input into the switch, if the amount of packets held in the queue for the one communication port is equal to or larger than a certain first threshold value, and if the sum of the amounts of packets held in the plurality of queues is equal to or larger than a certain second threshold value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTIONS OF THE DRAWINGS

FIGS. 3A and 3B are explanatory diagrams illustrating conditions for outputting a BP (Back Pressure) issue request signal;

FIGS. 4A and 4B are explanatory diagrams illustrating conditions for outputting a BP release request signal;

FIG. 5 is an explanatory diagram illustrating an example of the structure of a threshold value table;

FIG. 6 is an explanatory diagram schematically illustrating the configuration of a key length management unit;

FIG. 7 is an explanatory diagram illustrating an example of the structure of a stored-packet-amount table;

FIGS. 10A and 10B are explanatory diagrams illustrating examples of threshold value settings;

FIG. 19 is an explanatory diagram illustrating an example of the structure of a chain management table;

FIG. 20 is an explanatory diagram illustrating an example of the structure of a start address management table;

FIG. 23 is an explanatory diagram illustrating an example of the structure of each address FIFO;

FIGS. 25A to 25D are explanatory diagrams (part 1) illustrating the state of the output packet buffer and the state of each table at the time of packet reception;

FIG. 35 is an explanatory diagram (part 1) illustrating the state of the output packet buffer and the state of each table at the time of packet transmission;

FIG. 36 is an explanatory diagram (part 2) illustrating the state of the output packet buffer and the state of each table at the time of packet transmission;

DESCRIPTION OF EMBODIMENT(S)

In the packet transmission apparatus described above, the output packet buffer stores a queue of packets to be output from each communication port. The queue for each communication port has preset threshold values, a back-pressure issue threshold value for requesting the application of back pressure for that communication port and a back-pressure release threshold value for requesting the release of the back pressure. In the following description, back pressure may be abbreviated as "BP" for simplicity.

If the amount of packets queued for a given communication port exceeds the BP issue threshold value, a BP issue request signal is output for that communication port. At other communication ports that received the BP issue request signal, if a packet to be transferred to the communication port for which the BP issue request signal has been output is received, the packet is not transferred or the packet transfer rate is adjusted for the communication port for which the BP issue request signal has been output.

The BP issue request signal thus reduces the amount of packets to be transferred to the communication port for which the amount of queued packets has exceeded the BP issue threshold value. Thereafter, if the amount of packets queued for that communication port decreases below the BP release threshold value, a BP release request signal is output. Other communication ports that received the BP release request signal resume the packet transfer or restore the packet transfer rate to its original setting. With this processing, the packet transmission apparatus prevents packet discarding from occurring due to an overflow of the output packet buffer.

According to the above processing, whether to output or not output the BP issue request signal is decided based on whether or not the amount of packets queued for any particular communication port exceeds the BP issue threshold value that defines the amount of queued packets allowed for that particular communication port. As a result, if the amount of packets queued for any one communication port exceeds the BP issue threshold value, the BP issue request signal is output even when the amount of packets queued for other communication ports is small and there is sufficient storage space available in the output packet buffer as a whole. Accordingly, with the above processing, effective use is not made of the storage space of the output packet buffer.

Figure 1:
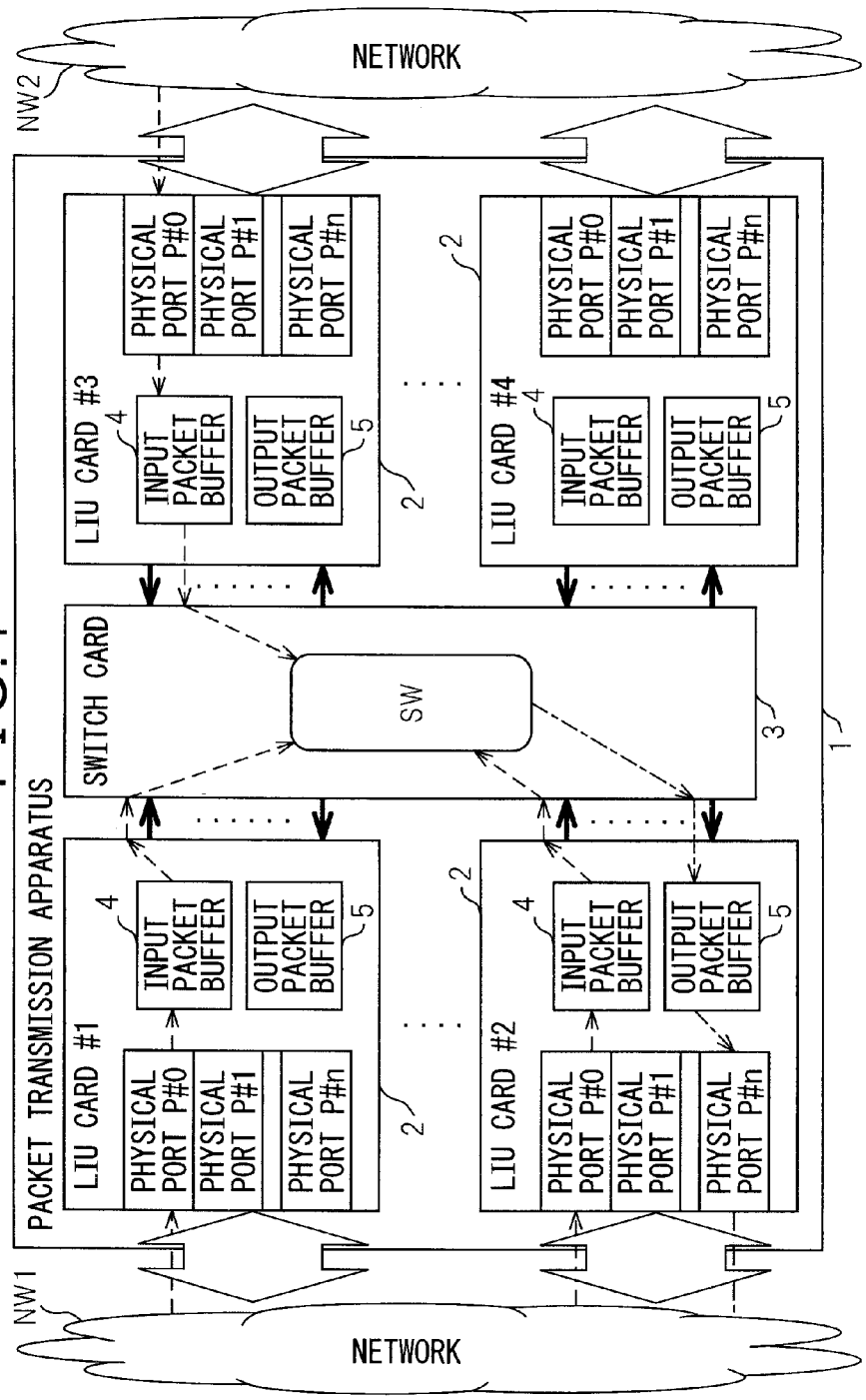
FIG. 1 is an explanatory diagram schematically illustrating the configuration of a packet transmission apparatus according to an embodiment.

Embodiments will be described below with reference to the accompanying drawings. FIG. 1 is an explanatory diagram schematically illustrating the configuration of a packet transmission apparatus according to an embodiment. Reference numeral 1 indicates the packet transmission apparatus, reference numerals 2, 2, . . . indicate line interface unit (LIU) cards, reference numeral 3 indicates a switch card, and reference numerals NW1 and NW2 indicate networks. The packet transmission apparatus 1 may be, for example, a layer 2 switch, but the scope of the present embodiment is not limited to a layer 2 switch; rather, the present embodiment is widely applicable to various kinds of packet transmission apparatuses having a back-pressure function for adjusting the amount of packets to be stored in an output packet buffer.

The packet transmission apparatus 1 is equipped with the plurality of LIU cards 2, 2, . . . , including the LIU cards #1 to #4, and the switch card. Each of the LIU cards 2, 2, . . . includes a plurality of physical ports P#0 to P#n for receiving packets arriving from the network NW1 and/or network NW2 or transmitting packets onto the network NW1 and/or network NW2. Hereinafter, the plurality of LIU cards 2, 2, . . . may be collectively referred to as the "LIU card 2." Similarly, the plurality of physical ports P#0 to P#n may be collectively referred to as the "physical port P." The physical port P may be an example of the communication port.

The packet transmission apparatus 1 includes an input packet buffer 4 where the packets received from the network NW1 and/or network NW2 are stored temporarily before they are transferred to the switch card 3. The packet transmission apparatus 1 further includes an output packet buffer 5 where the packets received from the switch card 3 are stored temporarily before they are transmitted out onto the network NW1 and/or network NW2.

The packets arriving from the network NW1 and/or network NW2 are transferred to the switch card 3, for example, by taking the path indicated by dashed lines in FIG. 1. First, each incoming packet is received at the physical port P. After being stored temporarily in the input packet buffer 4, the packet is transferred to the switch card 3.

The switch card 3 identifies the outgoing physical port for the packet, i.e., the physical port where the packet is outputted, and transfers the packet to the LIU card 2 that contains the identified physical port. This output path is indicated by semi-dashed lines.

The LIU card 2 that received the packet from the switch card 3 performs scheduling control and output control to transmit the packet from the identified physical ports P onto the network NW1 and/or network NW2.

The physical port from which the packet is to be transmitted out onto the network NW1 and/or network NW2 in this way is the physical port to which the packet is transferred or directed by packet switching in the packet transmission apparatus 1. In the following description, the physical port to which a given packet is transferred by packet switching in the packet transmission apparatus 1 may be referred to as the "outgoing port" for that packet. Further, in the following description, the packet to be transferred to a given physical port by packet switching in the packet transmission apparatus 1 may be referred to as the "packet addressed" to that physical port or as the "packet directed" to that physical port.

Figure 2:
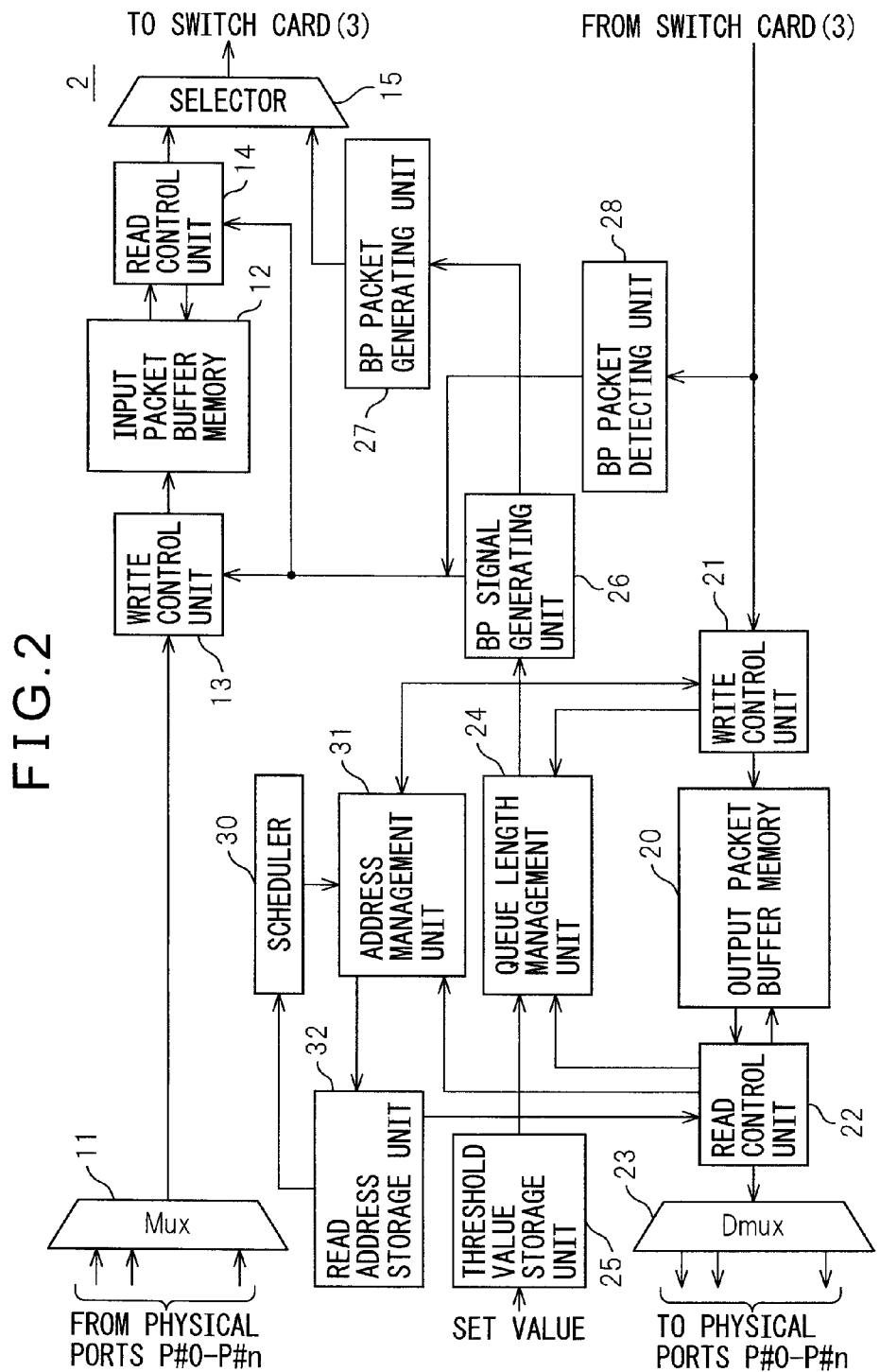
FIG. 2 is an explanatory diagram schematically illustrating the configuration of a LIU (Line Interface Unit) card.

FIG. 2 is an explanatory diagram schematically illustrating the configuration of the LIU card 2 depicted in FIG. 1. Reference numeral 11 indicates a multiplexer (Mux), reference numeral 12 indicates an input packet buffer memory, reference numeral 13 indicates a write control unit, reference numeral 14 indicates a read control unit, and reference numeral 15 indicates a selector.

Reference numeral 20 indicates an output packet buffer memory, reference numeral 21 indicates a write control unit, reference numeral 22 indicates a read control unit, reference numeral 23 indicates a demultiplexer (Dmux), and reference numeral 24 indicates a queue length management unit.

Reference numeral 25 indicates a threshold value management unit, reference numeral 26 indicates a BP signal generating unit, reference numeral 27 indicates a BP packet generating unit, and reference numeral 28 indicates a BP packet detecting unit. Further, reference numeral 30 indicates a scheduler, reference numeral 31 indicates an address management unit, and reference numeral 32 indicates a read address storage unit.

The LIU card 2 thus includes the multiplexer (Mux) 11, input packet buffer memory 12, write control unit 13, read control unit 14, selector 15, output packet buffer memory 20, write control unit 21, read control unit 22, and demultiplexer (Dmux) 23.

The LIU card 2 further includes the queue length management unit 24, threshold value management unit 25, BP signal generating unit 26, BP packet generating unit 27, BP packet detecting unit 28, scheduler 30, address management unit 31, and read address storage unit 32.

The multiplexer (Mux) 11 multiplexes the packets received via the respective physical ports P from the network NW1 and/or network NW2. The input packet buffer memory 12 is used to provide a storage area for the input packet buffer 4 depicted in FIG. 1, and stores the packets received from the network NW1 and/or network NW2.

The write control unit 13 writes the packets received from the multiplexer 11 into the input packet buffer memory 12. The write control unit 13 receives a BP issue request signal generated for a given physical port P provided in the packet transmission apparatus 1. The BP issue request signal is a signal for requesting the application of back pressure for a designated physical port P, and is generated by the BP signal generating unit 26 and BP packet detecting unit 28 to be described later.

When the BP issue request signal generated for a given physical port P#x is received, the write control unit 13 inhibits the writing of any packet directed to that physical port P#x. The write control unit 13 inhibits the writing of packets by discarding the packets directed to the physical port P#x in accordance with the capacity of the input packet buffer memory 12.

The write control unit 13 receives a BP release request signal generated for a given physical port P provided in the packet transmission apparatus 1. The BP release request signal is a signal for requesting the release of the back pressure being applied for a designated physical port P, and is generated by the BP signal generating unit 26 and BP packet detecting unit 28 to be described later. When the BP release request signal generated for a given physical port P#x is received, the write control unit 13 permits the writing of packets directed to that physical port P#x.

The read control unit 14 reads the packets from the input packet buffer memory 12 and transfers them to the switch card 3. The read control unit 14 receives a BP issue request signal generated for a given physical port P provided in the packet transmission apparatus 1. When the BP issue request signal generated for a given physical port P#x is received, the read control unit 14 inhibits the reading from the input packet buffer memory 12 of any packet directed to that physical port P#x.

The read control unit 14 receives a BP release request signal generated for a given physical port P provided in the packet transmission apparatus 1. When the BP release request signal generated for a given physical port P#x is received, the read control unit 14 permits the reading of packets directed to the physical port P#x. In this way, the write control unit 13 and read control unit 14 control the input to the switch card 3 of the packets received via each physical port P from the network NW1 and/or network NW2. The write control unit 13 and read control unit 14 may constitute the packet input control unit.

The selector 15 selects the read control unit 14 or the BP packet generating unit 27 as the packet input source for the switch card 3, depending on from which side, the read control unit 14 or the BP packet generating unit 27, a packet is output.

The output packet buffer memory 20 is used to provide a storage area for the output packet buffer 5 depicted in FIG. 1, and stores the packets to be output onto the network NW1 and/or network NW2. A queue is provided for each individual physical port P of the LIU card 2, and each packet directed to a given physical port P is held in the queue provided for that physical port P. The output packet buffer memory 20 stores a plurality of such queues provided for the respective physical ports P of the LIU card 2.

The write control unit 21 writes each packet received from the switch card 3 into the output packet buffer memory 20. The write control unit 21 also passes the received packet to the queue length management unit 24.

As will be described later, the write control unit 21 supplies the address management unit 31 with packet information of the packet to be written to the output packet buffer memory 20. The packet information contains the size of the packet and information identifying the outgoing port for that packet. When writing the packet to the output packet buffer memory 20, the write control unit 21 receives from the address management unit 31 a write address value indicating the address at which to write the packet.

The read control unit 22, under control of the scheduler 30, reads out of the output packet buffer memory 20 the packets to be output from the respective physical ports P, and supplies them to the demultiplexer (Dmux) 23. The read control unit 22 also passes the thus readout packets to the queue length management unit 24.

The demultiplexer (Dmux) 23 demultiplexes the multiplexed packets read out of the output packet buffer memory 20 into individual packets directed to the respective physical ports P. The demultiplexer (Dmux) 23 also adjusts the rate of the packets to be output from each physical port P.

The queue length management unit 24 monitors the amount of packets held in each of the queues provided for the respective physical ports P. The queue length management unit 24 also monitors the sum of the amounts of packets held in the plurality of queues.

The threshold value management unit 25 stores BP issue threshold values Tdi0, Tdi1, ..., Tdin and BP release threshold values Tdr0, Tdr1, ..., Tdrn preset for the respective queues provided for the respective physical ports P#0, P#1, ..., P#n. The threshold value management unit 25 also stores a BP issue threshold value Tai and BP release threshold value Tar preset for the sum of the amounts of packets to be held in the plurality of queues.

In the following description, the BP issue threshold values Tdi0 to Tdin and the BP release threshold values Tdr0 to Tdrn may be referred to as the "local BP issue threshold values" and "local BP release threshold values," respectively. In the following description, the BP issue threshold value Tai and the BP release threshold value Tar may be referred to as the "global BP issue threshold value" and "global BP release threshold value," respectively.

Any one of the local BP issue threshold values Tdi0 to Tdin may be an example of the first threshold value. The global BP issue threshold value Tai may be an example of the second threshold value. Any one of the local BP release threshold values Tdr0 to Tdrn may be the third threshold value. The global BP release threshold value Tar is the fourth threshold value.

The BP signal generating unit 26 generates the BP issue request signal and BP release request signal. If the amount of packets held in the queue for a given physical port P#x becomes equal to or larger than the local BP issue threshold value Tdix, and if the sum of the amounts of packets held in the plurality of queues provided for the plurality of physical ports P#0 to P#n becomes equal to or larger than the global BP issue threshold value Tai, then the BP signal generating unit 26 generates the BP issue request signal for that physical port P#x.

For simplicity, in the following description, the sum of the amounts of packets held in the plurality of queues provided for the plurality of physical ports P#0 to P#n may be referred to simply as the "total packet amount."

After the BP issue request signal has been generated for the given physical port P#x, if the amount of packets held in the queue for that physical port P#x decreases below the local BP release threshold value Tdrx, the BP signal generating unit 26 generates the BP release request signal for the physical port P#x. Further, after the BP issue request signal has been generated for the given physical port P#x, if the total packet amount decreases below the global BP release threshold value Tar, the BP signal generating unit 26 likewise generates the BP release request signal for that physical port P#x.

The BP issue request signal and BP release request signal may be examples of the stop signal and permit signal, respectively. The BP signal generating unit 26 supplies the generated BP issue request signal or BP release request signal to both the write control unit 13 and the read control unit 14. The BP signal generating unit 26 may supply the generated signal to the BP packet generating unit 27 in order to notify it of the generation of the BP issue request signal or BP release request signal.

When the BP issue request signal is generated by the BP signal generating unit 26, the BP packet generating unit 27 generates a BP issue request packet requesting the application of back pressure for the designated physical port P#x. The BP issue request packet may be an example of the stop signal packet. When the BP release request signal is generated by the BP signal generating unit 26, the BP packet generating unit 27 generates a BP release request packet requesting the release of the back pressure being applied for the designated physical port P#x.

The BP packet generating unit 27 supplies the generated BP issue request packet or BP release request packet to the switch card 3 via the selector 15. The BP issue request packet or BP release request packet is transferred via the switch card 3 to each LIU card 2 provided in the packet transmission apparatus 1.

The BP packet detecting unit 28 detects the BP issue request packet or BP release request packet generated by some other LIU card 2 and transferred via the switch card 3. When the BP issue request packet is received, the BP packet detecting unit 28 supplies the BP issue request signal generated for the designated physical port P#x to both the write control unit 13 and the read control unit 14. When the BP release request packet is detected, the BP packet detecting unit 28 supplies the BP release request signal generated for the designated physical port P#x to both the write control unit 13 and the read control unit 14.

The scheduler 30 performs scheduling control to select the outgoing port for which an outgoing packet is to be read out of the output packet buffer memory 20, while performing bandwidth control by monitoring the contracted bandwidth of each customer using the line connected to each physical port P. The scheduler 30 may select the outgoing port in a round robin fashion.

The address management unit 31 issues a write address value for the write control unit 21 to write a packet to the output packet buffer memory 20. The address management unit 31 supplies the write address value to the write control unit 21. The address management unit 31 issues a read address value for the read control unit 22 to read a packet from the output packet buffer memory 20, in accordance with the scheduling control by the scheduler 30. The address management unit 31 supplies the read address value to the read address storage unit 32.

The read address storage unit 32 temporarily stores the read address value received from the address management unit 31. The read address storage unit 32 sequentially determines the outgoing physical ports for the outgoing packets in accordance with the actual rates of the respective physical ports P. From among the stored read address values, the read address storage unit 32 supplies to the read control unit 22 the address value for reading the packet directed to each determined outgoing physical port. The read control unit 22 reads the packet, to be output from each physical port P, from the address supplied from the read address storage unit 32.

Next, a description will be given of the conditions under which the BP signal generating unit 26 outputs the BP issue request signal and/or BP release request signal. FIGS. 3A and 3B are explanatory diagrams illustrating the conditions for outputting the BP issue request signal, and FIGS. 4A and 4B are explanatory diagrams illustrating the conditions for outputting the BP release request signal. For simplicity of illustration, the following description is given by assuming that the plurality of physical ports P#0 to P#n are represented by three physical ports P#0, P#1, and P#2.

Reference numerals 100, 101, and 102 designate the queues #0, #1, and #2 provided for the respective physical ports P#0, P#1, and P#2 in order to hold the packets to be output from these ports. Reference numeral 103 designates a global storage area used for storing the packets in the plurality of queues #0 to #2. The same designations are used in FIGS. 10A and 10B, FIGS. 11A and 11B, FIGS. 12A and 12B, FIGS. 13A and 13B, FIGS. 14A and 14B, FIGS. 15A and 15B, and FIGS. 16A and 16B.

In the illustrated example, the physical ports P#0 to P#2 that use the respective queues #0 to #2 may constitute some or all of the physical ports P provided on the LIU card 2. The storage area available for use by the queues #0 to #2 may be the entire storage area reserved in the output packet buffer memory 20 for the queues that hold the packets to be output from the respective physical ports. Alternatively, the storage area available for use by the queues #0 to #2 may be part of the storage area reserved in the output packet buffer memory 20 for the queues that hold the packets to be output from the respective physical ports.

In FIGS. 3A and 3B, the storage capacity that the packets stored in each of the queues #0 to #2 or in the global storage area 103 occupy in the entire storage capacity of each of the queues #0 to #2 or of the global storage area 103 is represented by the height of a hatched region. The packet amount defined by each hatched region in the queues #0 to #2 corresponds to the packet amount defined by the region of the same hatching pattern in the global storage area 103. With respect to the amounts of packets stored in the respective queues #0 to #2, the position of the local BP issue threshold values Tdi0 to Tdi2 and the position of the local BP release threshold values Tdr0 to Tdr2 preset for the respective queues #0 to #2 are designated by dashed lines 104 and 105, respectively. Further, with respect to the amount of packets stored in the global storage area 103, the position of the global BP issue threshold value Tai and the position of the global BP release threshold value Tar are designated by dashed lines 106 and 107, respectively. The same designations are used in FIGS. 4A and 4B, FIGS. 10A and 10B, FIGS. 11A and 11B, FIGS. 12A and 12B, FIGS. 13A and 13B, FIGS. 14A and 14B, FIGS. 15A and 15B, and FIGS. 16A and 16B.

In the case of FIG. 3A, the amount of packets stored in the queue #0 exceeds the local BP issue threshold value Tdi0. If back-pressure control is performed for the queue #0 only for the reason that the amount of stored packets has exceeded the local BP issue threshold value Tdi0, any packet directed to the physical port #0 can no longer be stored when there is storage space available in the global storage area 103.

In the present embodiment, even when the amount of packets stored in the queue #0 is equal to or larger than the local BP issue threshold value Tdi0, the BP issue request signal for the queue #0 is not issued until the total packet amount, i.e., the sum of the amounts of packets stored in the plurality of queues #0 to #2, becomes equal to or larger than the global BP issue threshold value Tai. That is, if the amount of packets stored in the queue #0 becomes equal to or larger than the local BP issue threshold value Tdi0, and if the total packet amount also becomes equal to or larger than the global BP issue threshold value Tai, as illustrated in FIG. 3B, then the BP signal generating unit 26 generates the BP issue request signal for the queue #0.

Once the BP issue request signal for the queue #0 is generated, no further packets are stored in the queue #0, so that the amount of packets stored in the queue #0 begins to decrease. In the present embodiment, when the total packet amount has decreased below the global BP release threshold value Tar, the BP signal generating unit 26 generates the BP release request signal for the queue #0. This condition is illustrated in FIG. 4A. When the amount of packets stored in the queue #0 has decreased below the local BP release threshold value Tdr0, the BP signal generating unit 26 generates the BP release request signal for the queue #0. This condition is illustrated in FIG. 4B.

Since back pressure is not applied until the total packet amount becomes equal to or larger than the global BP issue threshold value, as described above, any packet to be placed into the queue that already holds a larger amount of packets than the local BP issue threshold value can be stored in a storage area reserved for some other queue; this serves to increase the efficiency of use of the global storage area 103.

The local BP issue threshold values Tdi0 to Tdin and BP release threshold values Tdr0 to Tdrn and the global BP issue threshold value Tai and BP release threshold value Tar are stored in the form of a threshold value table 110 in the threshold value storage unit 25. FIG. 5 is an explanatory diagram illustrating an example of the structure of the threshold value table 110.

The threshold value table 110 stores, at addresses "0" to "n" corresponding to the respective physical ports P#0 to P#n, the local BP issue threshold values Tdi0 to Tdin and BP release threshold values Tdr0 to Tdrn preset for the respective queues provided for the respective physical ports P#0 to P#n. The threshold value table 110 further stores the global BP issue threshold value Tai and global BP release threshold value Tar at address "n+1".

If the BP issue request signal is output, there is a time lag before the write control unit 13 and read control unit 14 stop forwarding the packets to the switch card 3, and the packets continue to flow into the queue during this time lag. In view of this, the local BP issue threshold values Tdi0 to Tdin and the global BP issue threshold value Tai may each be set lower than the actually available storage capacity so that the packets received during the time lag can be stored.

Similarly, if the BP release request signal is output, there is a time lag before the write control unit 13 and read control unit 14 resume forwarding the packets. If the buffer empties during this time, a situation such as an output rate drop or a burst may occur. In view of this, the local BP release threshold values Tdr0 to Tdrn and the global BP release threshold value Tar may each be set so that the amount of packets stored in the queue does not decrease to 0.

The key length management unit 24 in FIG. 2 compares the amount of stored packets with the respective threshold values. FIG. 6 is an explanatory diagram schematically illustrating the configuration of the key length management unit 24 depicted in FIG. 2. Reference numeral 40 designates a received-packet size calculation unit, reference numeral 41 designates an outgoing-packet size calculation unit, reference numeral 42 designates a stored-packet-amount memory, reference numeral 43 designates a stored-amount calculation unit, and reference numeral 44 designates a comparator.

The key length management unit 24 thus includes the received-packet size calculation unit 40, outgoing-packet size calculation unit 41, stored-packet-amount memory 42, stored-amount calculation unit 43, and comparator 44.

The received-packet size calculation unit 40 receives from the write control unit 21 the packet to be written to the output packet buffer memory 20. The received-packet size calculation unit 40 calculates the size of this packet.

The outgoing-packet size calculation unit 41 receives from the read control unit 22 the packet read out of the output packet buffer memory 20. The outgoing-packet size calculation unit 41 calculates the size of this packet.

The stored-packet-amount memory 42 stores a stored-packet-amount table 111 that stores the amounts of packets held in the queues for the respective physical ports P#0 to P#n and the total packet amount. FIG. 7 is an explanatory diagram illustrating an example of the structure of the stored-packet-amount table 111.

The stored-packet-amount table 111 stores, at addresses "0" to "n" corresponding to the respective physical ports P#0 to P#n, the amounts of packets held in the queues for the respective physical ports P#0 to P#n. The stored-packet-amount table 111 further stores the total packet amount at address "n+1".

Reference is made to FIG. 6. The stored-amount calculation unit 43 adds the size calculated by the received-packet size calculation unit 40 to the stored packet amount stored in the stored-packet-amount table 111 for the queue designated as the queue for the outgoing port for the packet received from the write control unit 21. Further, the stored-amount calculation unit 43 adds the size calculated by the received-packet size calculation unit 40 to the total packet amount stored in the stored-packet-amount table 111.

The stored-amount calculation unit 43 subtracts the size calculated by the outgoing-packet size calculation unit 41 from the stored packet amount stored in the stored-packet-amount table 111 for the queue designated as the queue for the outgoing port for the packet received from the read control unit 22. Further, the stored-amount calculation unit 43 subtracts the size calculated by the outgoing-packet size calculation unit 41 from the total packet amount stored in the stored-packet-amount table 111.

The comparator 44 reads the local BP issue threshold values Tdi0 to Tdin and local BP release threshold values Tdr0 to Tdrn and the global BP issue threshold value Tai and global BP release threshold value Tar from the threshold value table 110 maintained in the threshold value storage unit 25.

The comparator 44 compares the amounts of packets stored in the respective queues with the local BP issue threshold values Tdi0 to Tdin preset for the respective queues. The comparator 44 compares the amounts of packets stored in the respective queues with the local BP release threshold values Tdr0 to Tdrn preset for the respective queues. Further, the comparator 44 compares the total packet amount with the global BP issue threshold value Tai. The comparator 44 compares the total packet amount with the global BP release threshold value Tar. The comparator 44 supplies the results of the comparisons to the BP signal generating unit 26. Based on the results of the comparisons, the BP signal generating unit 26 determines whether to generate the BP issue request signal and whether to generate the BP release request signal.

Figure 8:
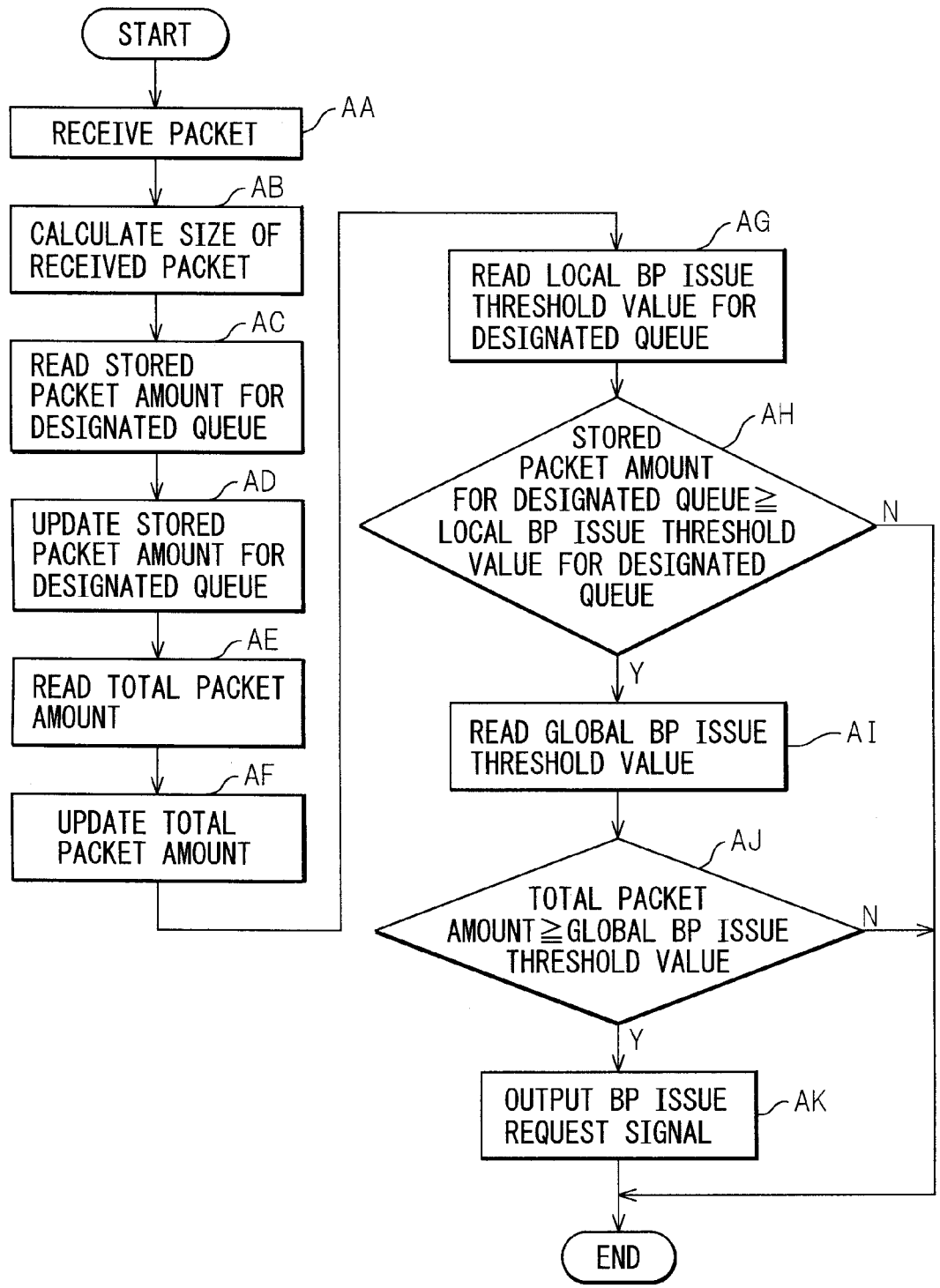
FIG. 8 is an explanatory diagram illustrating the sequence of operations performed when outputting the BP issue request signal.

Next, a description will be given of the sequence of operations performed when outputting the BP issue request signal. FIG. 8 is an explanatory diagram illustrating the sequence of operations performed when outputting the BP issue request signal. In an alternative embodiment, the following operations AA to AK may be called the steps.

In operation AA, the received-packet size calculation unit 40 receives from the write control unit 21 the packet to be written to the output packet buffer memory 20. In operation AB, the received-packet size calculation unit 40 calculates the size of the received packet.

In operation AC, the stored-amount calculation unit 43 reads from the stored-packet-amount table 111 the stored packet amount for the queue designated as the queue for the outgoing port for the packet received from the write control unit 21. In the description of FIG. 8, the designated queue will be referred to as the "queue #x," and the physical port for which the queue #x is provided will be referred to as the "physical port P#x."Further, in the description of FIG. 8, the local BP issue threshold value preset for the queue #x will be referred to as the "local BP issue threshold value Tdix."

In operation AD, the stored-amount calculation unit 43 updates the stored value of the stored packet amount for the designated queue #x by adding the size calculated by the received-packet size calculation unit 40 to the readout stored packet amount. The stored-amount calculation unit 43 stores the updated stored packet amount in the stored-packet-amount table 111.

In operation AE, the stored-amount calculation unit 43 reads the total packet amount from the stored-packet-amount table 111. In operation AF, the stored-amount calculation unit 43 updates the stored value of the total packet amount by adding the size calculated by the received-packet size calculation unit 40 to the readout total packet amount. The stored-amount calculation unit 43 stores the updated total packet amount in the stored-packet-amount table 111.

In operation AG, the comparator 44 reads the local BP issue threshold value Tdix from the threshold value table 110 maintained in the threshold value storage unit 25. In operation AH, the comparator 44 compares the updated stored packet amount for the designated queue #x with the local BP issue threshold value Tdix.

If the stored packet amount for the designated queue #x is equal to or larger than the local BP issue threshold value Tdix (Y in operation AH), the process proceeds to operation AI. If the stored packet amount for the designated queue #x is smaller than the local BP issue threshold value Tdix (N in operation AH), the process is terminated, and the BP signal generating unit 26 does not generate the BP issue request signal.

In operation AI, the comparator 44 reads the global BP issue threshold value Tai from the threshold value table 110 maintained in the threshold value storage unit 25. In operation AJ, the comparator 44 compares the updated total packet amount with the global BP issue threshold value Tai.

If the total packet amount is equal to or larger than the global BP issue threshold value Tai (Y in operation AJ), the process proceeds to operation AK. If the total packet amount is smaller than the global BP issue threshold value Tai (N in operation AJ), the process is terminated, and the BP signal generating unit 26 does not generate the BP issue request signal.

In operation AK, the BP signal generating unit 26 outputs the BP issue request signal for the physical port P#x for which the queue #x is provided. Thereafter, the process is terminated. In the above sequence of operations described with reference to FIG. 8, if the amount of packets held in the queue for a given physical port P#x is equal to or larger than the local BP issue threshold value Tdix, and if the total packet amount is equal to or larger than the global BP issue threshold value Tai, the BP signal generating unit 26 generates the BP issue request signal for the physical port P#x.

Figure 9:
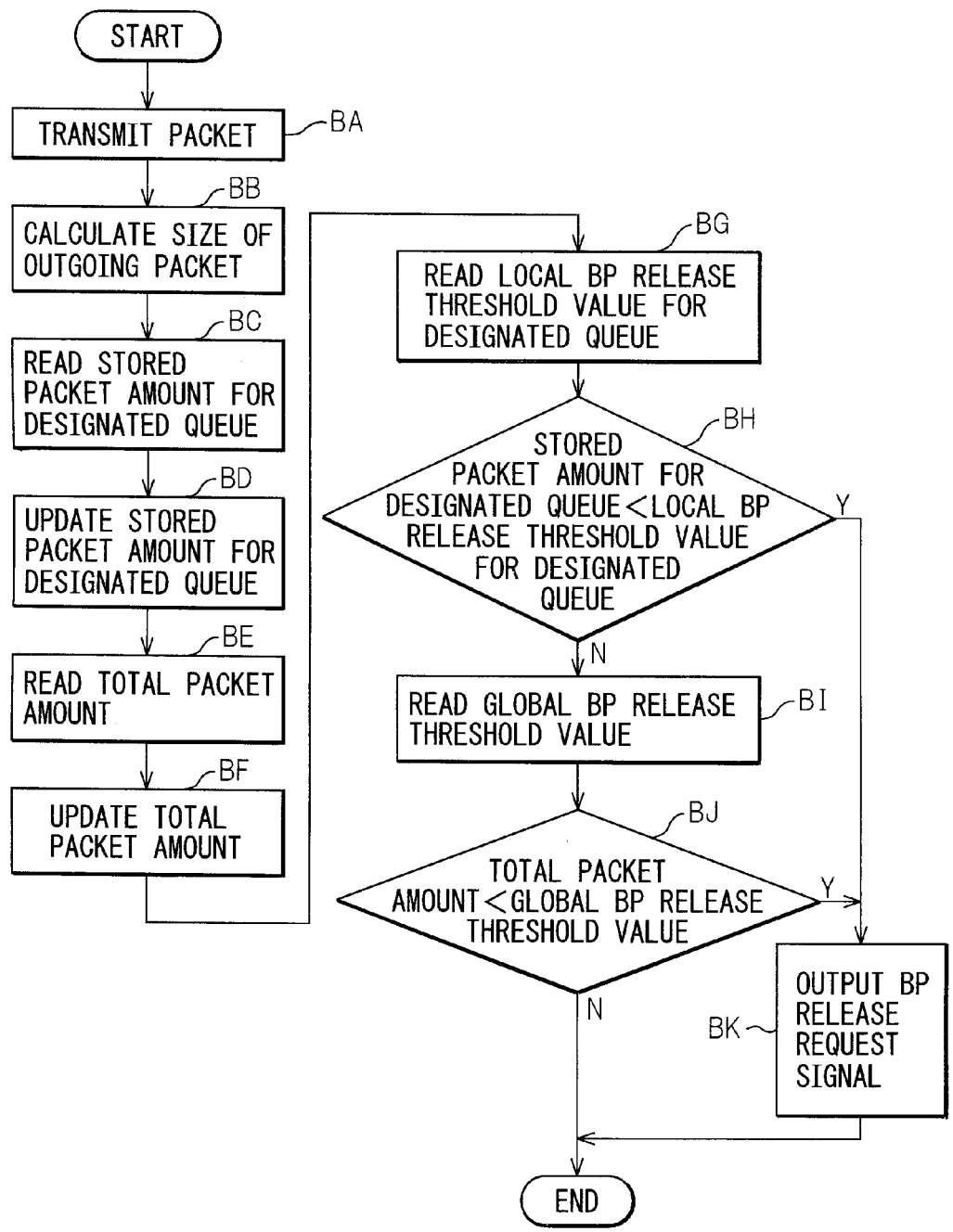
FIG. 9 is an explanatory diagram illustrating the sequence of operations performed when outputting the BP release request signal.

FIG. 9 is an explanatory diagram illustrating the sequence of operations performed when outputting the BP release request signal. In an alternative embodiment, the following operations BA to BK may be called the steps.

In operation BA, the outgoing-packet size calculation unit 41 receives from the read control unit 22 the packet read out of the output packet buffer memory 20. In operation BB, the outgoing-packet size calculation unit 41 calculates the size of the received packet.

In operation BC, the stored-amount calculation unit 43 reads from the stored-packet-amount table 111 the stored packet amount for the queue designated as the queue for the outgoing port for the packet received from the read control unit 22. In the description of FIG. 9, the designated queue will be referred to as the "queue #x," and the physical port for which the queue #x is provided will be referred to as the "physical port P#x." Further, in the description of FIG. 9, the local BP release threshold value preset for the queue #x will be referred to as the "local BP release threshold value Tdrx."

In operation BD, the stored-amount calculation unit 43 updates the stored value of the stored packet amount for the designated queue #x by subtracting the size calculated by the outgoing-packet size calculation unit 41 from the readout stored packet amount. The stored-amount calculation unit 43 stores the updated stored packet amount in the stored-packet-amount table 111.

In operation BE, the stored-amount calculation unit 43 reads the total packet amount from the stored-packet-amount table 111. In operation BF, the stored-amount calculation unit 43 updates the stored value of the total packet amount by subtracting the size calculated by the outgoing-packet size calculation unit 41 from the readout total packet amount. The stored-amount calculation unit 43 stores the updated total packet amount in the stored-packet-amount table 111.

In operation BG, the comparator 44 reads the local BP release threshold value Tdrx from the threshold value table 110 maintained in the threshold value storage unit 25. In operation BH, the comparator 44 compares the updated stored packet amount for the designated queue #x with the local BP release threshold value Tdrx.

If the stored packet amount for the designated queue #x is smaller than the local BP release threshold value Tdrx (Y in operation BH), the process proceeds to operation BK. If the stored packet amount for the designated queue #x is not smaller than the local BP release threshold value Tdrx (N in operation BH), the process proceeds to operation BI.

In operation BI, the comparator 44 reads the global BP release threshold value Tar from the threshold value table 110 maintained in the threshold value storage unit 25. In operation BJ, the comparator 44 compares the updated total packet amount with the global BP release threshold value Tar.

If the total packet amount is smaller than the global BP release threshold value Tar (Y in operation BJ), the process proceeds to operation BK. If the total packet amount is not smaller than the global BP release threshold value Tar (N in operation BJ), the process is terminated, and the BP signal generating unit 26 does not generate the BP release request signal.

In operation BK, the BP signal generating unit 26 outputs the BP release request signal for the physical port P#x for which the queue #x is provided. Thereafter, the process is terminated. In the above sequence of operations described with reference to FIG. 9, if the amount of packets held in the queue for the given physical port P#x becomes smaller than the local BP release threshold value Tdrx, or if the total packet amount becomes smaller than the global BP release threshold value Tar, the BP signal generating unit 26 generates the BP release request signal for the physical port P#x.

The process for generating the BP issue request signal and BP release request signal according to the present embodiment will be described below with reference to FIGS. 10A and 10B, FIGS. 11A and 11B, FIGS. 12A and 12B, FIGS. 13A and 13B, FIGS. 14A and 14B, FIGS. 15A and 15B, and FIGS. 16A and 16B.

For simplicity of illustration, the following description is given by assuming that the number of physical ports P#0 to P#n is 3, i.e., the plurality of physical ports P#0 to P#n are represented by three physical ports P#0, P#1, and P#2. Queues #0, #1, and #2 for holding outgoing packets are provided for the respective physical ports P#0, P#1, and P#2.

The storage capacity that can be used to store packets in the global storage area 103 reserved to implement the plurality of queues #0 to #2 is assumed to be 300. If this storage capacity is divided equally among the three queues #0 to #2, the storage capacity available for each queue is 100. The unit of value used here to represent the amount of packet data and the storage capacity is not specifically limited, and any unit representing the number of data bits can be used.

Assume the case where the local BP issue threshold values Tdi0 to Tdi2 and the local BP release threshold values Tdr0 to Tdr2 are set to "80" and "40", respectively, and the global BP issue threshold value Tai and the global BP release threshold value Tar are set to "200" and "100", respectively, as illustrated in FIGS. 10A and 10B.

Figure 11:
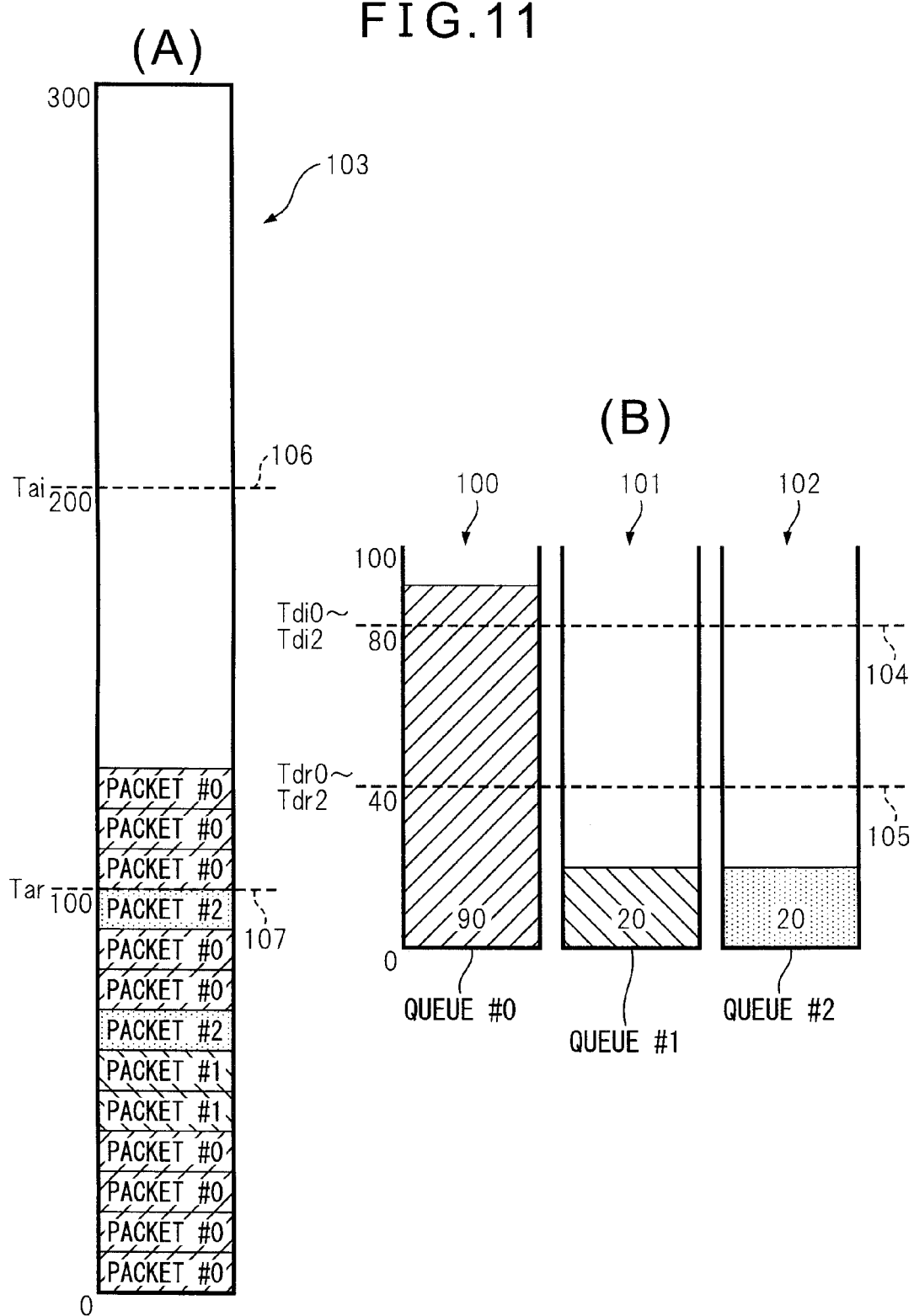
FIGS. 11A and 11B are explanatory diagrams (part 1) illustrating the state of an output packet buffer.

FIGS. 11A and 11B are explanatory diagrams (part 1) illustrating the state of the output packet buffer. In FIG. 11A, "PACKET #0" designates the storage capacity occupied by the packets held in the queue #0. "PACKET #1" designates the storage capacity occupied by the packets held in the queue #1. "PACKET #2" designates the storage capacity occupied by the packets held in the queue #2. The same designations are used in FIGS. 12A, 13A, 14A, 15A, and 16A.

In the illustrated example, as packets are stored in the queues #0 to #2, the amount of packets stored in the queue #0 reaches "90", while the amount of packets stored in each of the queues #1 and #2 is "20". In this case, the stored packet amount "90" of the queue #0 is larger than its local BP issue threshold value Tdi0 (=80). However, the total packet amount (90+20+20=130) is smaller than the global BP issue threshold value Tai (=200). Accordingly, the BP signal generating unit 26 does not generate the BP issue request signal for the queue #0.

Figure 12:
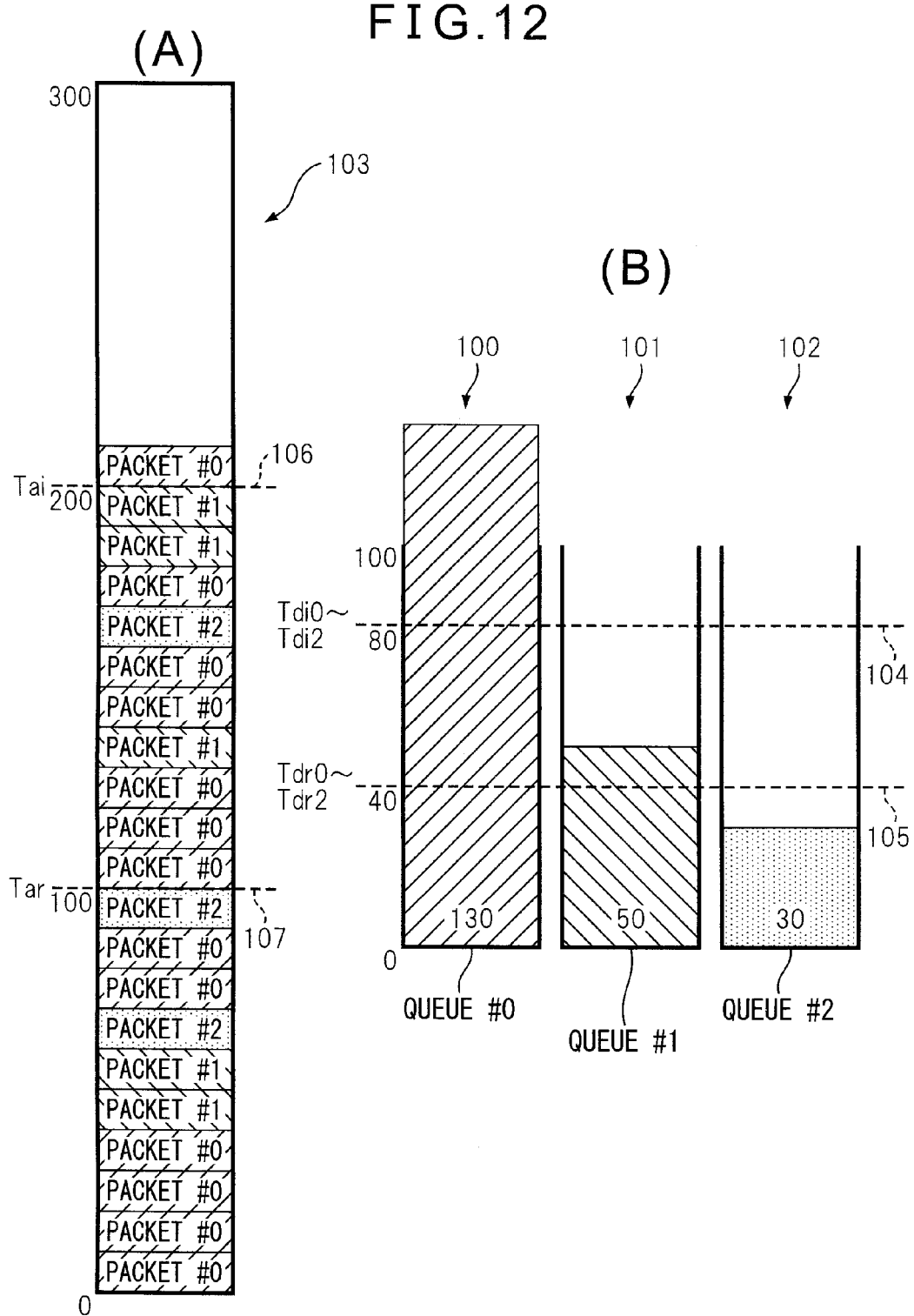
FIGS. 12A and 12B are explanatory diagrams (part 2) illustrating the state of the output packet buffer.

FIGS. 12A and 12B are explanatory diagrams (part 2) illustrating the state of the output packet buffer. In the illustrated example, the amount of packets stored in the queue #0 increases to "130", and the amounts of packets stored in the queues #1 and #2 also increase to "50" and "30", respectively. In this case, the stored packet amount "130" of the queue #0 is larger than its local BP issue threshold value Tdi0 (=80), and the total packet amount (130+50+30=210) is also larger than the global BP issue threshold value Tai (=200). Accordingly, the BP signal generating unit 26 generates the BP issue request signal for the queue #0.

In this case, since the queue #0 holds the amount of packets larger than the storage capacity "100" allocated to it by equally dividing the global storage area 103 among the three queues #0 to #2, it can be said that the queue #0 is using the storage area reserved for the other queues #1 and #2.

Figure 13:
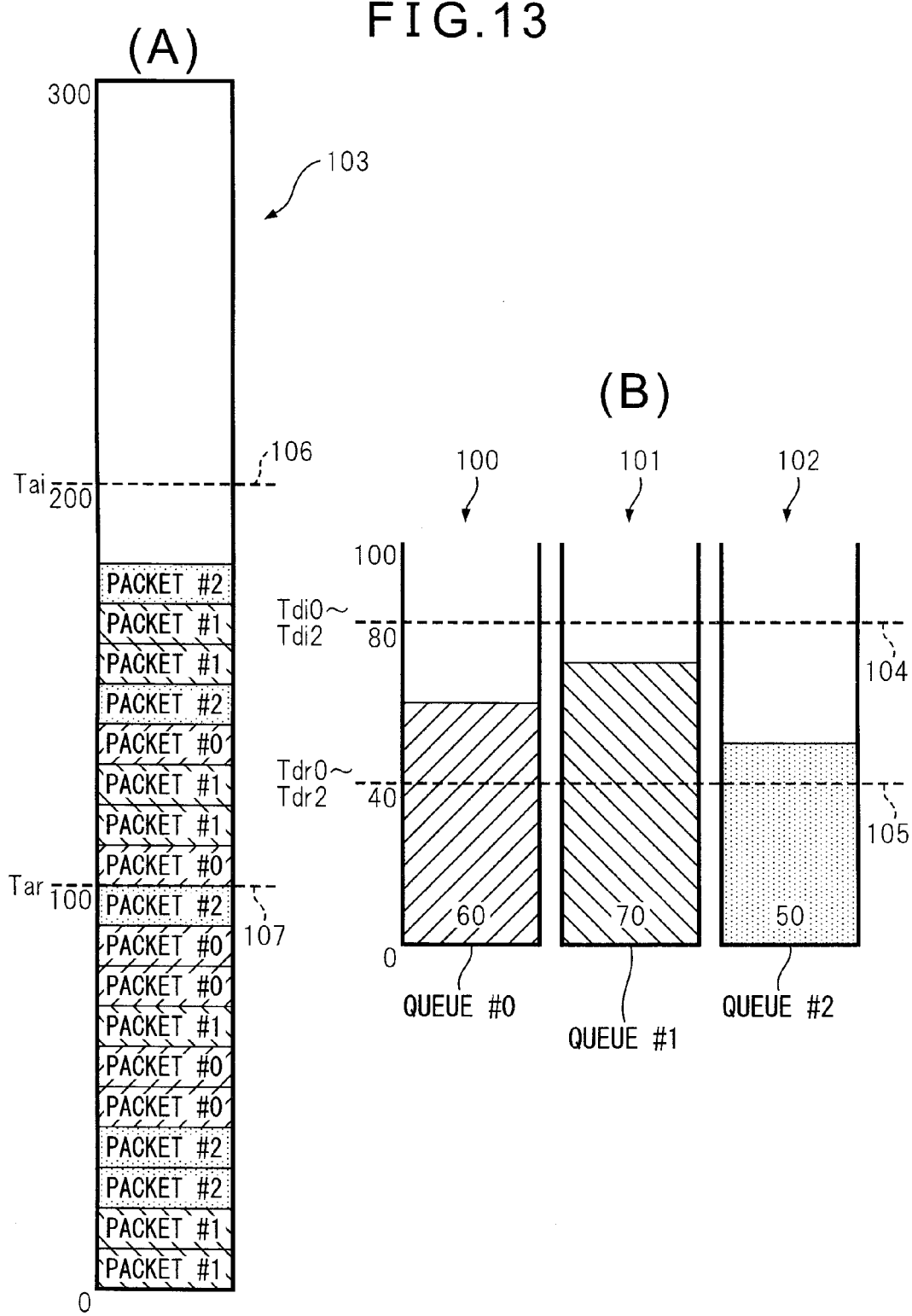
FIGS. 13A and 13B are explanatory diagrams (part 3) illustrating the state of the output packet buffer.

When back pressure is applied for the physical port P#0 in response to the BP issue request signal generated by the BP signal generating unit 26, the amount of packets stored in the queue #0 begins to decrease. FIGS. 13A and 13B are explanatory diagrams (part 3) illustrating the state of the output packet buffer. In the illustrated example, the amount of packets stored in the queue #0 decreases to "60", while the amounts of packets stored in the queues #1 and #2 increase to "70" and "50", respectively.

In this case, the stored packet amount "60" of the queue #0 is larger than its local BP release threshold value Tdr0 (=40), and the total packet amount (60+70+50=180) is also larger than the global BP release threshold value Tar (=100). Accordingly, the BP signal generating unit 26 does not generate the BP release request signal for the queue #0. Therefore, the back pressure applied for the physical port P#0 is not released.

Figure 14:
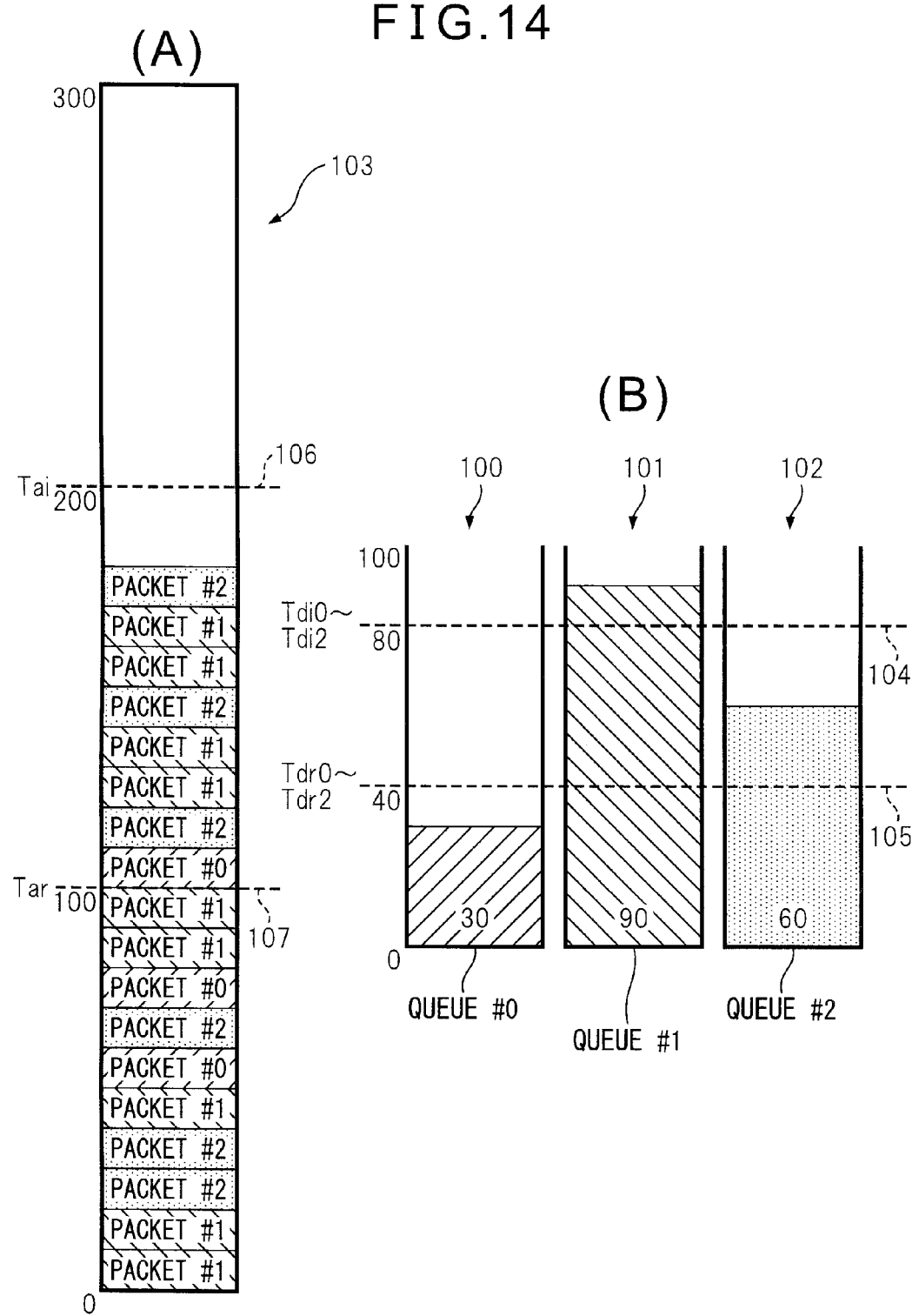
FIGS. 14A and 14B are explanatory diagrams (part 4) illustrating the state of the output packet buffer.

With the back pressure applied for the physical port P#0, the amount of packets stored in the queue #0 further decreases. In the meantime, packets continue to flow into the other queues #1 and #2. FIGS. 14A and 14B are explanatory diagrams (part 4) illustrating the state of the output packet buffer. In the illustrated example, the amount of packets stored in the queue #0 decreases to "30", while the amounts of packets stored in the queues #1 and #2 increase to "90" and "60", respectively.

In this case, while the total packet amount (30+90+60=180) is larger than the global BP release threshold value Tar (=100), the stored packet amount "30" of the queue #0 is smaller than its local BP release threshold value Tdr0 (=40). Accordingly, the BP signal generating unit 26 generates the BP release request signal for the queue #0. The back pressure for the physical port P#0 is thus released.

On the other hand, the stored packet amount "90" of the queue #1 is larger than its local BP issue threshold value Tdi1 (=80). However, the total packet amount "180" is smaller than the global BP issue threshold value Tai (=200). Accordingly, the BP signal generating unit 26 does not generate the BP issue request signal for the queue #1.

Figure 15:
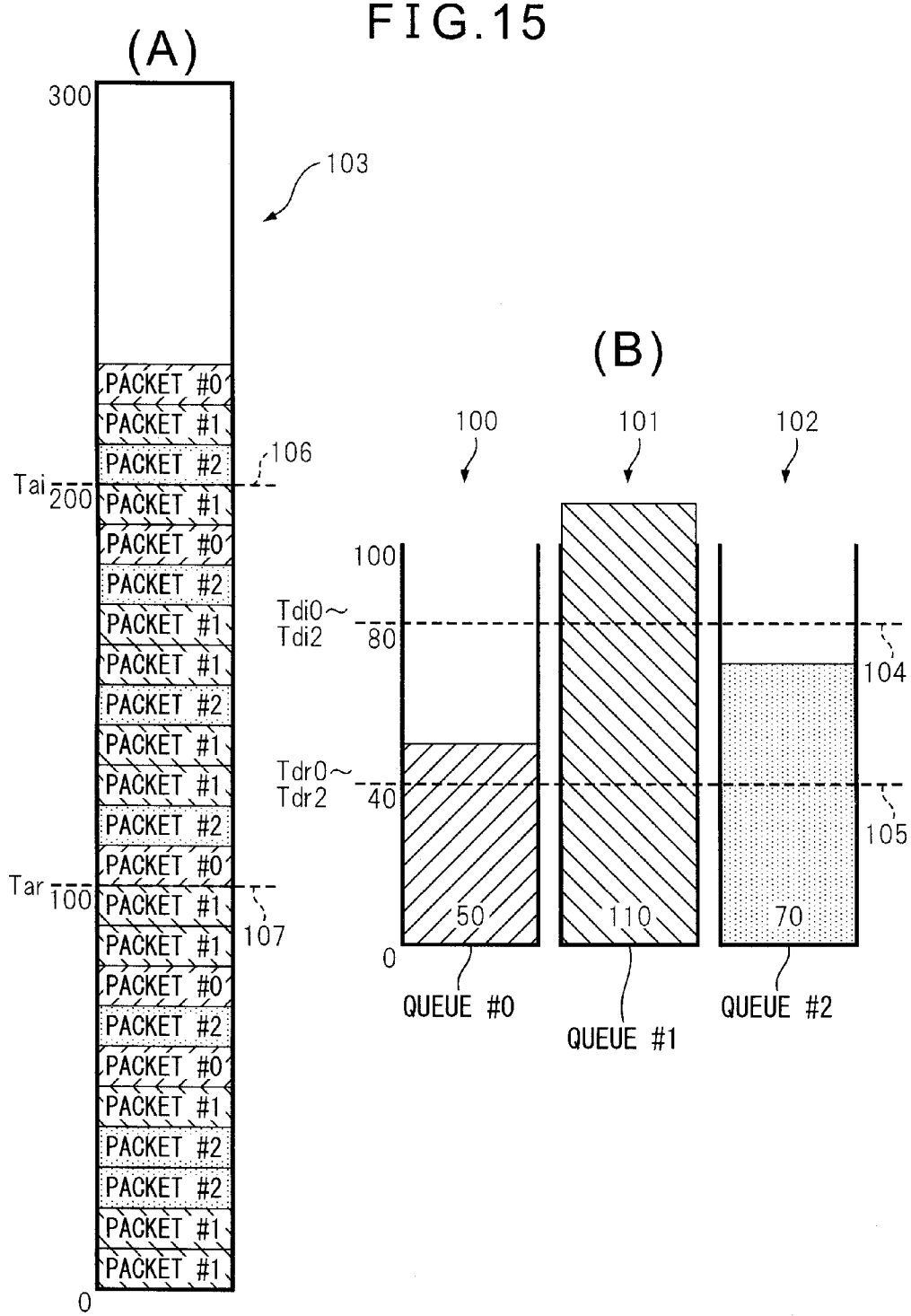
FIGS. 15A and 15B are explanatory diagrams (part 5) illustrating the state of the output packet buffer.

FIGS. 15A and 15B are explanatory diagrams (part 5) illustrating the state of the output packet buffer. In the illustrated example, the amount of packets stored in the queue #0 increases to "50", and the amounts of packets stored in the queues #1 and #2 also increase to "110" and "70", respectively. In this case, the stored packet amount "110" of the queue #1 is larger than its local BP issue threshold value Tdi1 (=80), and the total packet amount (50+110+70=230) is also larger than the global BP issue threshold value Tai (=200). Accordingly, the BP signal generating unit 26 generates the BP issue request signal for the queue #1.

In this case, since the queue #1 holds the amount of packets larger than the storage capacity "100" allocated to it by equally dividing the global storage area 103 among the three queues #0 to #2, it can be said that the queue #1 is using the storage area reserved for the other queues #0 and #2.

Figure 16:
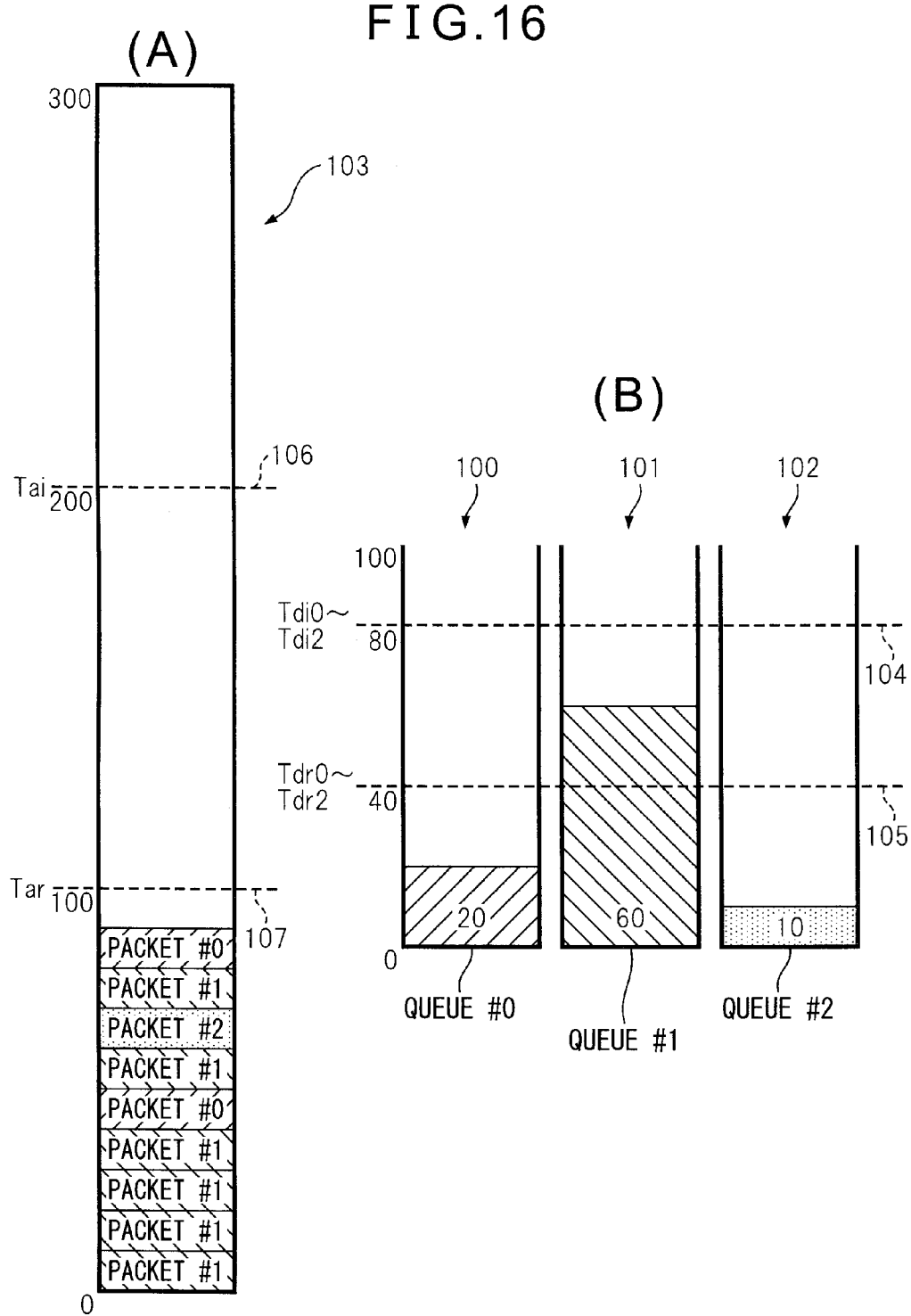
FIGS. 16A and 16B are explanatory diagrams (part 6) illustrating the state of the output packet buffer.

FIGS. 16A and 16B are explanatory diagrams (part 6) illustrating the state of the output packet buffer. In the illustrated example, the amount of packets stored in the queue #0 decreases to "20", and the amounts of packets stored in the queues #1 and #2 also decrease to "60" and "10", respectively. In this case, the stored packet amount "60" of the queue #1 is larger than its local BP release threshold value Tdr1 (=40), but the total packet amount (20+60+10=90) is smaller than the global BP release threshold value Tar (=100). Accordingly, the BP signal generating unit 26 generates the BP release request signal for the queue #1. The back pressure for the physical port P#1 is thus released.

According to the present embodiment, even when packets occur in a concentrated manner for any particular one of the plurality of queues, if the amounts of packets stored in other queues are small, the packets to be placed into that particular one queue can be stored using a free space available in the storage space provided for the plurality of queues. This serves to increase the efficiency of use of the storage space provided for the plurality of queues.

Next, a description will be given of address control that is performed when writing a packet to the output packet buffer memory 20. The size of the storage space that the output packet buffer memory 20 allocates to the queue for each physical port P is not of a fixed length. The output packet buffer memory 20 can vary the size of the storage space to be allocated to each queue.

Such a buffer memory control method is disclosed in patent document 3 mentioned above. An address control method similar to the one disclosed in patent document 3 will be described below as an example of the address control method for the output packet buffer memory 20. However, the method for controlling the output packet buffer memory 20 is not limited to the following example, the only requirement is that the output packet buffer memory 20 be allowed to vary the size of the storage space to be allocated to each queue.

Figures 17, 18:
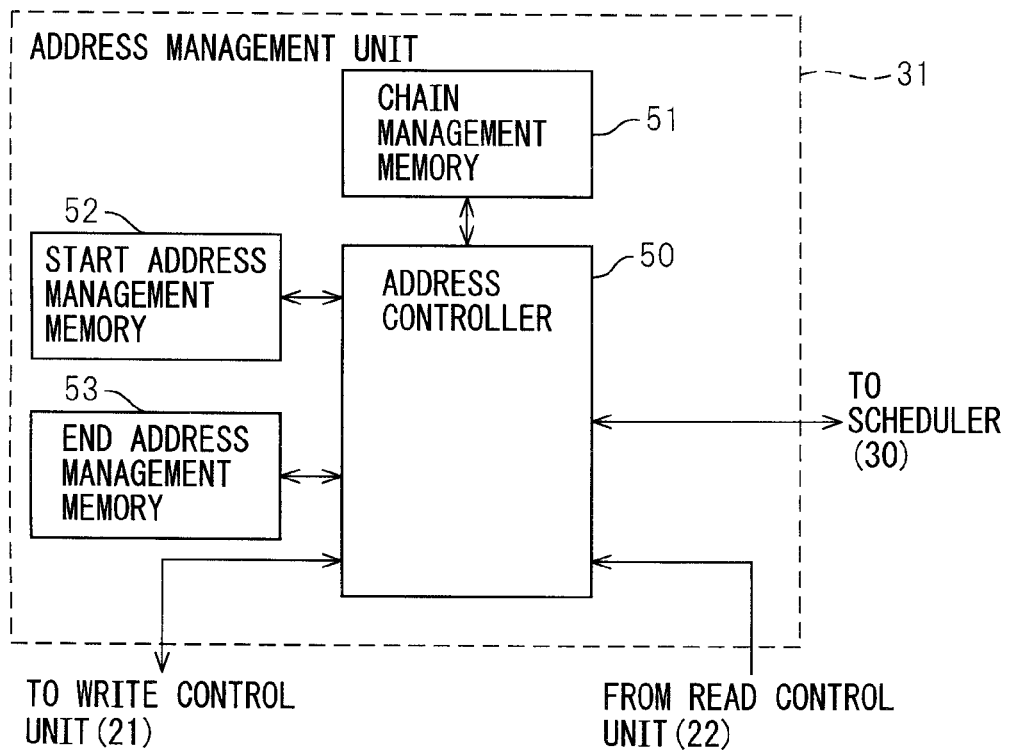
FIG. 17 is an explanatory diagram illustrating an example of the structure of the output packet buffer.
FIG. 18 is an explanatory diagram schematically illustrating the configuration of an address management unit.

FIG. 17 is an explanatory diagram illustrating an example of the structure of the output packet buffer 5 provided in the output packet buffer memory 20. The output packet buffer 5 stores packets at addresses defined in the address space ranging from "0" to "m".

FIG. 18 is an explanatory diagram schematically illustrating the configuration of the address management unit 31 depicted in FIG. 2. Reference numeral 50 indicates an address controller, reference numeral 51 indicates a chain management memory, reference numeral 52 indicates a start address management memory, and reference numeral 53 indicates an end address management memory. The address management unit 31 thus includes the address controller 50, chain management memory 51, start address management memory 52, and end address management memory 53.

The chain management memory 51 stores a chain management table 120. FIG. 19 is an explanatory diagram illustrating an example of the structure of the chain management table 120. The chain management table 120 manages the sequencing of the packets stored in the output packet buffer 5, by using a chain of address values indicating the locations of the packets stored in the output packet buffer 5. The chain management table 120 also manages free addresses available in the output packet buffer 5.

For each address in the packet buffer, the chain management table 120 stores an address value indicating the address of the next packet, i.e., the packet that follows the packet stored at the current address. In the following description, the value stored in the chain management table 120 to point to the storage address of the next packet may be referred to as the "next address value."

For each free address in the output packet buffer 5 at which no packet is stored, the chain management table 120 stores the value of another free address at which a packet is to be stored next following that free address. In the following description, the value stored in the chain management table 120 to point to another free address at which a packet is to be stored next may be referred to as the "next free address value."

The chain management table 120 stores next address values or next free address values at addresses "1" to "m" corresponding to the addresses "1" to "m" in the output packet buffer 5.

The start address management memory 52 stores a start address management table 121. FIG. 20 is an explanatory diagram illustrating an example of the structure of the start address management table 121. For each physical port P, the start address management table 121 stores an address value indicating the address in the output packet buffer 5 at which the start packet to be output to the physical port P is stored. In the following description, the address value stored in the start address management table 121 to point to the address in the output packet buffer 5 at which the start packet is stored may be referred to as the "start address value."

The start address management table 121 also stores an address value indicating the address of a free space at which a packet is to be written next into the output packet buffer 5. In the following description, the address value stored in the start address management table 121 to point to the address of the free space at which a packet is to be written next into the output packet buffer 5 may be referred to as the "free space start address value."

The start address management table 121 stores, at addresses "0" to "n" corresponding to the respective physical ports P#0 to P#n, the address values indicating the addresses in the output packet buffer 5 at which the start packets to be output to the respective physical ports P#0 to P#n are stored. The start address management table 121 also stores the free space start address value at address "n+1".

Figures 21, 22:
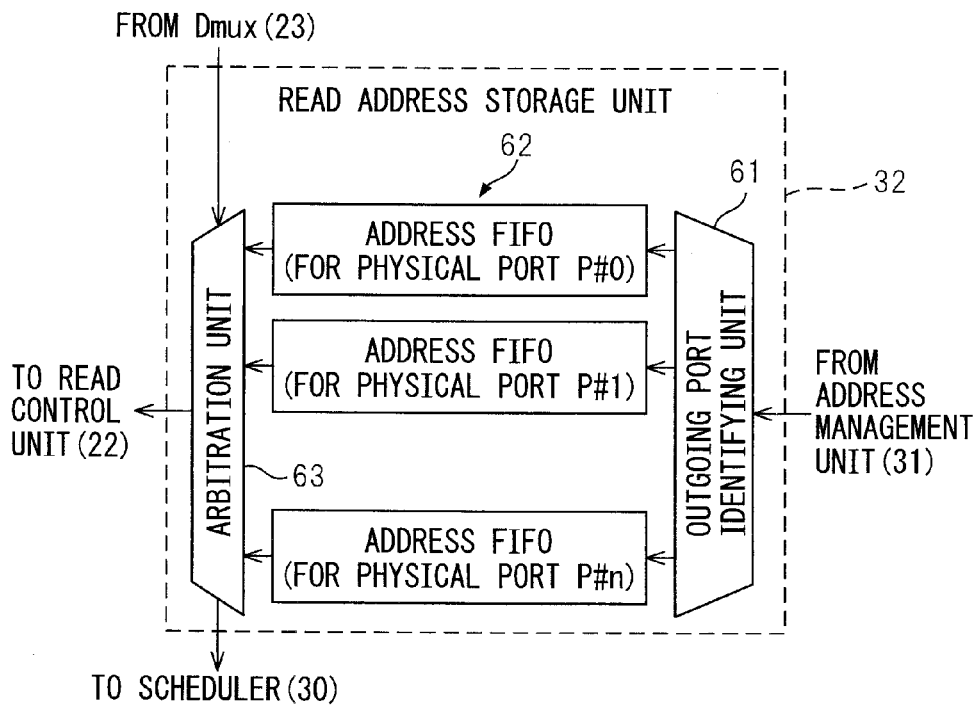
FIG. 21 is an explanatory diagram illustrating an example of the structure of an end address management table.
FIG. 22 is an explanatory diagram schematically illustrating the configuration of a read address storage unit.

The end address management memory 53 stores an end address management table 122. FIG. 21 is an explanatory diagram illustrating an example of the structure of the end address management table 122. For each physical port P, the end address management table 122 stores an address value indicating the address in the output packet buffer 5 at which the end packet to be output to the physical port P is stored. In the following description, the address value stored in the end address management table 122 to point to the address in the output packet buffer 5 at which the end packet is stored may be referred to as the "end address value."

The end address management table 122 also stores an address value indicating a free address in the output packet buffer 5 at which the packet at the end of the sequence is to be written. In the following description, the address value stored in the end address management table 122 to point to the address at which the packet at the end of the sequence is to be written may be referred to as the "free space end address value."

The end address management table 122 stores, at addresses "0" to "n" corresponding to the respective physical ports P#0 to P#n, the address values indicating the addresses in the output packet buffer 5 at which the end packets to be output to the respective physical ports P#0 to P#n are stored. The end address management table 122 also stores the free space start address value at address "n+1".

The operation and function of the address controller 50 will be described later in conjunction with the operation of the LIU card 2.

FIG. 22 is an explanatory diagram schematically illustrating the configuration of the read address storage unit 32 depicted in FIG. 2. Reference numeral 61 indicates an outgoing port identifying unit, reference numeral 62 indicates a plurality of address FIFOs provided one for each of the physical ports P#0 to P#n, and reference numeral 63 indicates an arbitration unit. The read address storage unit 32 thus includes the outgoing port identifying unit 61, the plurality of address FIFOs 62, and the arbitration unit 63.

The outgoing port identifying unit 61 receives a read address value from the address management unit 31. The outgoing port identifying unit 61 identifies the outgoing port determined by the scheduler 30. The outgoing port identified here is the outgoing port for the packet stored at the address specified by the received read address value. The outgoing port identifying unit 61 decides at which of the plurality of address FIFOs 62 provided for the respective physical ports P#0 to P#n the received read address value is to be stored, and stores the received read address value in the selected address FIFO.

The address FIFOs 62 store the read address values specifying the read addresses of the packets to be output to the respective physical ports P#0 to P#n. FIG. 23 is an explanatory diagram illustrating an example of the structure of each address FIFO 62. The address FIFO 62 stores read addresses at addresses defined in the address space ranging from "0" to "x."

Reference is made to FIG. 22. The arbitration unit 63 selects the address FIFO 62 from which to retrieve the read address value, and supplies the read address value retrieved from the selected address FIFO 62 to the read control unit 22. Further, as will be described later, the arbitration unit 63 stops the reading of packets for a specific physical port P in response to a back pressure signal Sbp.

Figure 24:
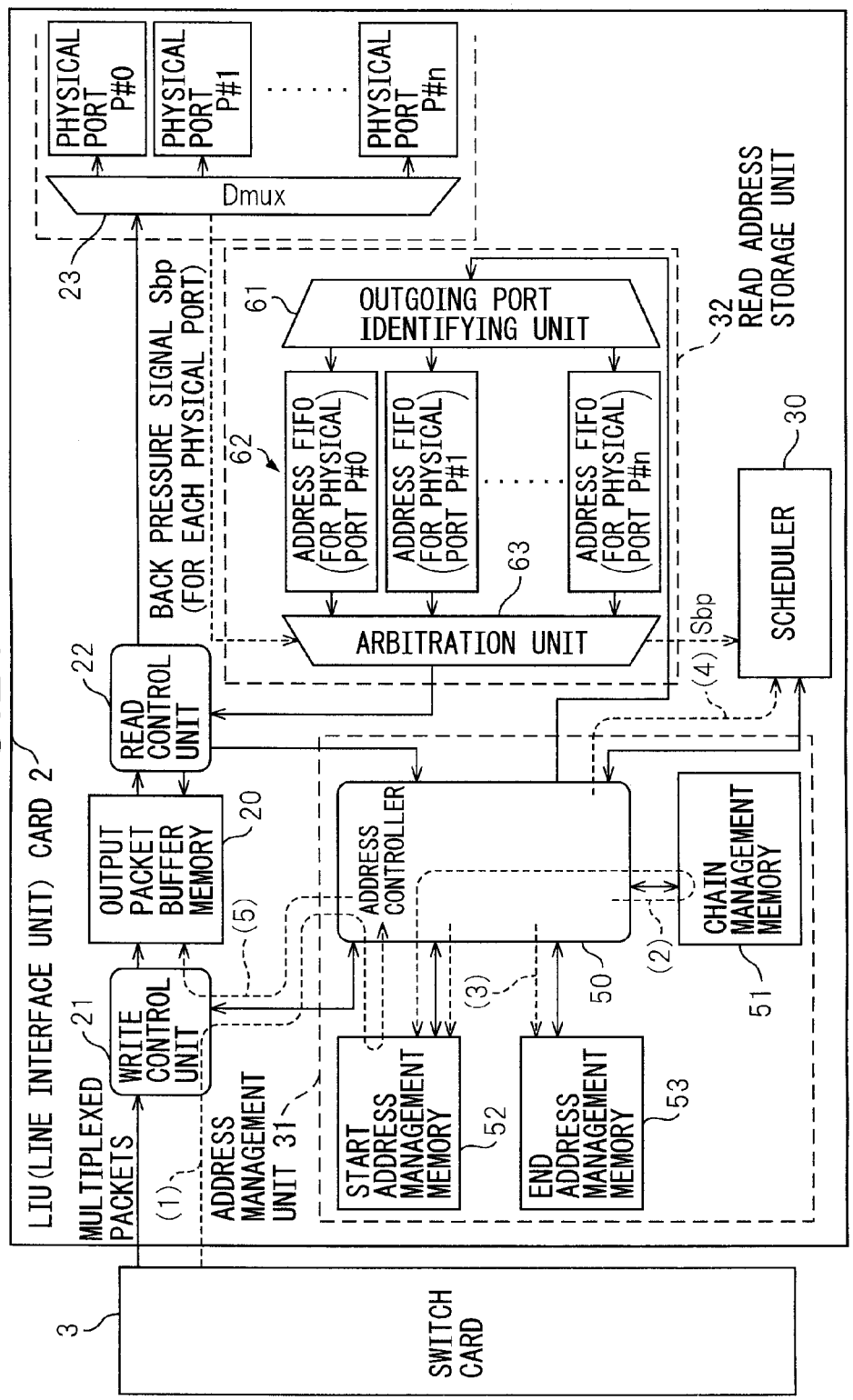
FIG. 24 is an explanatory diagram (part 1) illustrating the operation of the LIU card at the time of packet reception.

The operation of the LIU card 2 when a packet is received from the switch card 3 will be described with reference to FIGS. 24 to 33. FIG. 24 is an explanatory diagram (part 1) illustrating the operation of the LIU card 2 at the time of packet reception. First, a description will be given of the sequence of operations performed when the first packet is received for a queue associated with a given outgoing port for which no packets are received yet. The signal flows associated with the following operations (1) to (5) are indicated by dashed lines (1) to (5) in FIG. 24.

In operation (1), when a packet is received from the switch card 3, the write control unit 21 sends the packet information to the address controller 50. The packet information contains the size of the received packet and information identifying the outgoing port for that packet. The address controller 50 acquires the free space start address value from the start address management table 121.

In operation (2), the address controller 50 acquires the next free address value by reading from the chain management table 120 the contents stored at the address indicated by the free space start address value acquired in operation (1). The address controller 50 updates the free space start address value by writing the thus acquired next free address value to address "n+1" in the start address management table 121.

In operation (3), the address controller 50 writes the free space start address value acquired in operation (1) to the address corresponding to the outgoing port in the start address management table 121. This updates the start address value of the outgoing port stored in the start address management table 121. The address controller 50 also writes the free space start address value acquired in operation (1) to the address corresponding to the outgoing port in the end address management table 122. This updates the end address value of the outgoing port stored in the end address management table 122.

In operation (4), the address controller 50 sends the packet information to the scheduler 30. The packet information is used for read control by the scheduler 30.

In operation (5), the address controller 50 supplies the free space start address value acquired in operation (1) to the write control unit 21. The write control unit 21 stores the received packet at the address in the output packet buffer 5 pointed to by the free space start address value.

FIGS. 25A to 25D are explanatory diagrams (part 1) illustrating the state of the output packet buffer and the state of each table at the time of packet reception. In the state illustrated in FIGS. 25A to 25D, packets are not yet stored in the output packet buffer 5. That is, the output packet buffer 5 is completely empty. The chain management table 120 is filled only with next free addresses.

The address value of every address in the chain management table 120, with the exception of one address (in the illustrated example, address "0"), is specified by the next free address value stored at one of the other addresses. Using the next free address values thus stored at the respective addresses, the addresses in the chain management table 120 are interlinked in a chain-like fashion. The addresses in the chain management table 120 correspond one for one to the addresses in the output packet buffer 5. Thus, by interlinking the addresses in a chain-like fashion using the next free address values, the chain management table 120 can store the chain of free addresses available in the output packet buffer 5.

In the start address management table 121, start address values are not yet stored, and the free space start address value is "0". In the end address management table 121 also, end address values are not yet stored, and the free space end address value is "n".

Figure 26:
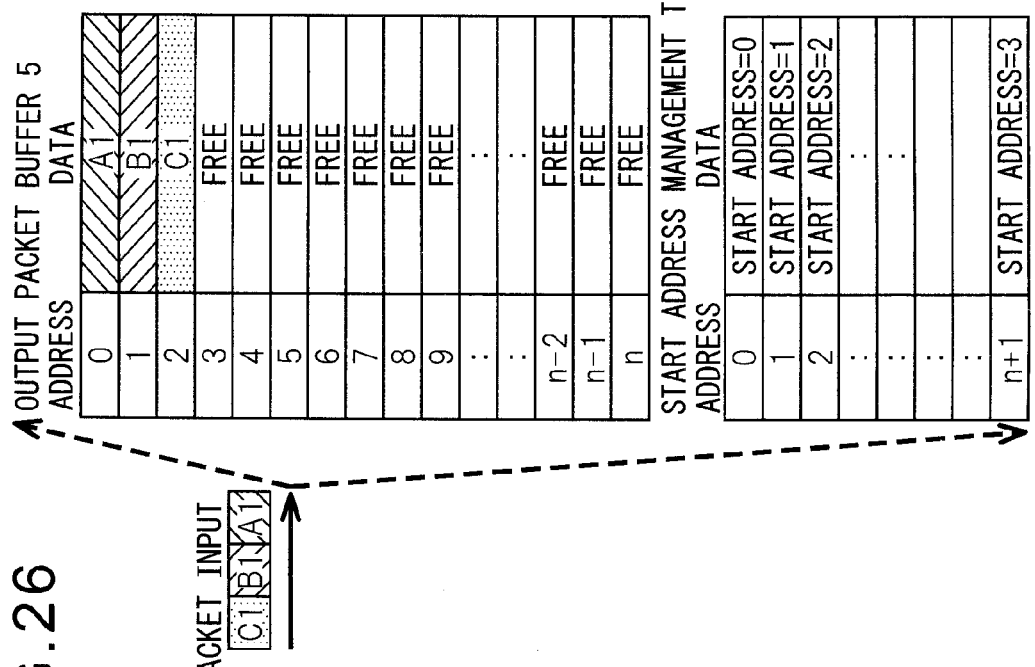
FIG. 26 is an explanatory diagram (part 2) illustrating the state of the output packet buffer and the state of each table at the time of packet reception.

FIG. 26 is an explanatory diagram (part 2) illustrating the state of the output packet buffer and the state of each table at the time of packet reception. Received packets A1, B1, and C1 are packets directed to the physical ports P#0, P#1, and P#2, respectively. The packets are received in the order of A1, B1, and C1, and are stored at addresses "0", "1", and "2", respectively, in the output packet buffer 5.

Since the packets that follow the respective packets stored at addresses "0", "1", and "2" in the output packet buffer 5 are not yet stored, the next address values stored at addresses "0", "1", and "2" in the chain management table 120 have no meaning.

The addresses "0", "1", and "2" in the output packet buffer 5 at which the packets A1, B1, and C1 are respectively stored are stored at addresses "0", "1", and "2" in the start address management table 121. Since the packets are written to the addresses "0", "1", and "2" in the output packet buffer 5, the free space start address value is "3".

The addresses "0", "1", and "2" in the output packet buffer 5 at which the packets A1, B1, and C1 are respectively stored are also stored at addresses "0", "1", and "2" in the end address management table 121. The free space end address value remains at "n".

Figure 27:
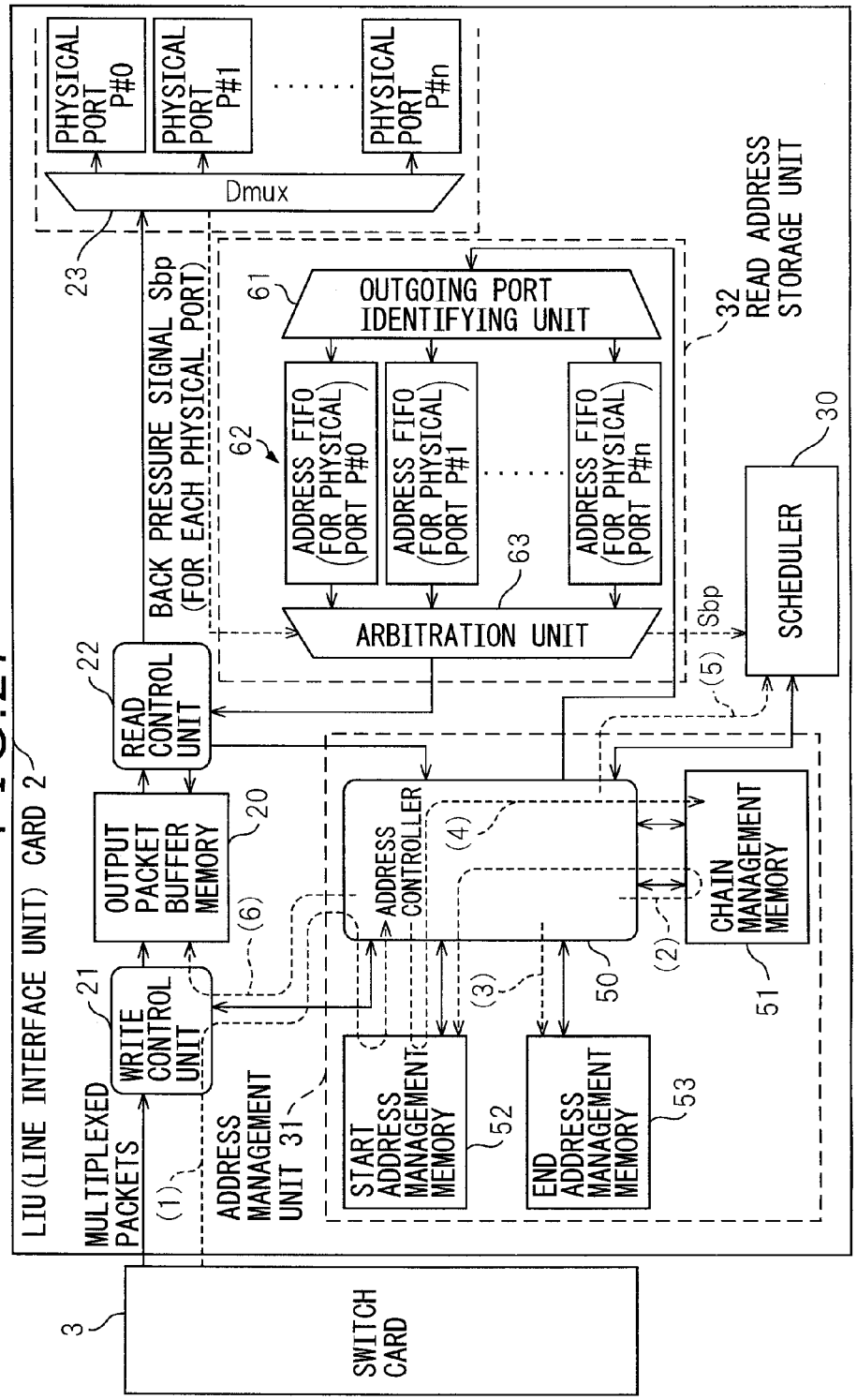
FIG. 27 is an explanatory diagram (part 2) illustrating the operation of the LIU card at the time of packet reception.

FIG. 27 is an explanatory diagram (part 2) illustrating the operation of the LIU card 2 at the time of packet reception. First, a description will be given of the sequence of operations performed when the next packet is received for a queue where a packet is already stored. The signal flows associated with the following operations (1) to (6) are indicated by dashed lines (1) to (6) in FIG. 27.

In operation (1), when a packet is received from the switch card 3, the write control unit 21 sends the packet information to the address controller 50. The address controller 50 acquires the free space start address value from the start address management table 121.

In operation (2), the address controller 50 acquires the next free address value by reading from the chain management table 120 the contents stored at the address indicated by the free space start address value acquired in operation (1). The address controller 50 updates the free space start address value by writing the thus acquired next free address value to the address "n+1" in the start address management table 121.

In operation (3), the address controller 50 writes the free space start address value acquired in operation (1) to the address corresponding to the outgoing port in the end address management table 122. This updates the end address value of the outgoing port stored in the end address management table 122.

In operation (4), the address controller 50 acquires the start address value of the outgoing port by reading from the start address management table 121 the contents stored at the address corresponding to the outgoing port. The address controller 50 writes the free space start address value acquired in operation (1) to the address in the chain management table 120 pointed to by the start address value of the outgoing port. This updates the address value chain stored in the chain management table 120 in corresponding relationship to the addresses in the output packet buffer 5 at which the packets directed to the outgoing port are stored.

In operation (5), the address controller 50 sends the packet information to the scheduler 30.

In operation (6), the address controller 50 supplies the free space start address value acquired in operation (1) to the write control unit 21. The write control unit 21 stores the received packet at the address in the output packet buffer 5 pointed to by the free space start address value.

In the case of a packet that uses a storage space corresponding to a plurality of addresses, the acquisition of the free address and the updating of the address value chain is repeated a plurality of times within the packet, and the addresses within the packet are interlinked in a chain-like fashion.

Figure 28:
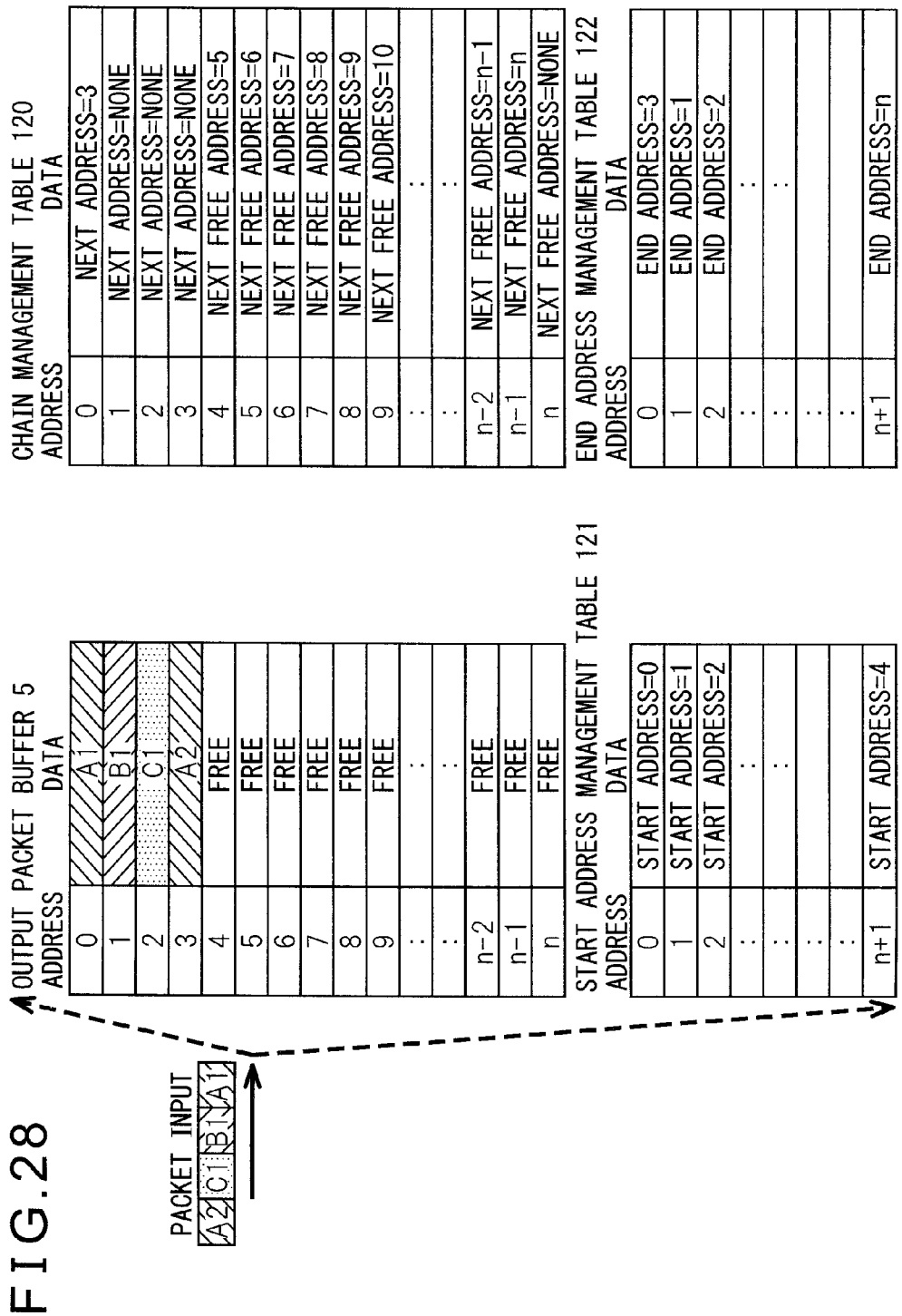
FIG. 28 is an explanatory diagram (part 3) illustrating the state of the output packet buffer and the state of each table at the time of packet reception.

FIG. 28 is an explanatory diagram (part 3) illustrating the state of the output packet buffer and the state of each table at the time of packet reception. The received packet A2 is a packet directed to the physical port P#0. Since the free space start address value stored in the start address management table 121 in FIG. 26 is "3", the packet A2 is stored at address "3" in the output packet buffer 5.

The next address value "3" is stored at address "0" in the chain management table 120. This next address value indicates that the packet A2 that follows the packet A1 stored at address "0" in the output packet buffer 5 is stored at address "3". In this way, the packet that follows the packet stored at the address of a given address value Ad1 in the output packet buffer 5 is stored at the address indicated by the address value Ad2 stored at the address of the address value Ad1 in the chain management table 120.

The addresses in the chain management table 120 correspond one for one to the addresses in the output packet buffer 5. Accordingly, the addresses in the chain management table 120 are interlinked in a chain-like fashion using the next address values stored at the respective addresses. Thus, by interlinking the addresses in a chain-like fashion using the next address values, the chain management table 120 stores a chain of addresses at which the packets directed to each given outgoing port are stored.

Since the packet that follows the packet A2 stored at address "3" in the output packet buffer 5 corresponding to address "3" in the chain management table 120 is not yet stored, the next address value stored at address "3" in the chain management table 120 has no meaning.

As the packet A2 is written to address "3" in the output packet buffer 5, the free space start address value stored in the start address management table 121 is now "4". Further, as the packet A2 directed to the physical port P#0 is written to address "3" in the output packet buffer 5, the end address value of the outgoing port P#0, stored in the end address management table 122 at address "0" corresponding to the outgoing port P#0, is updated to "3".

Figure 29:
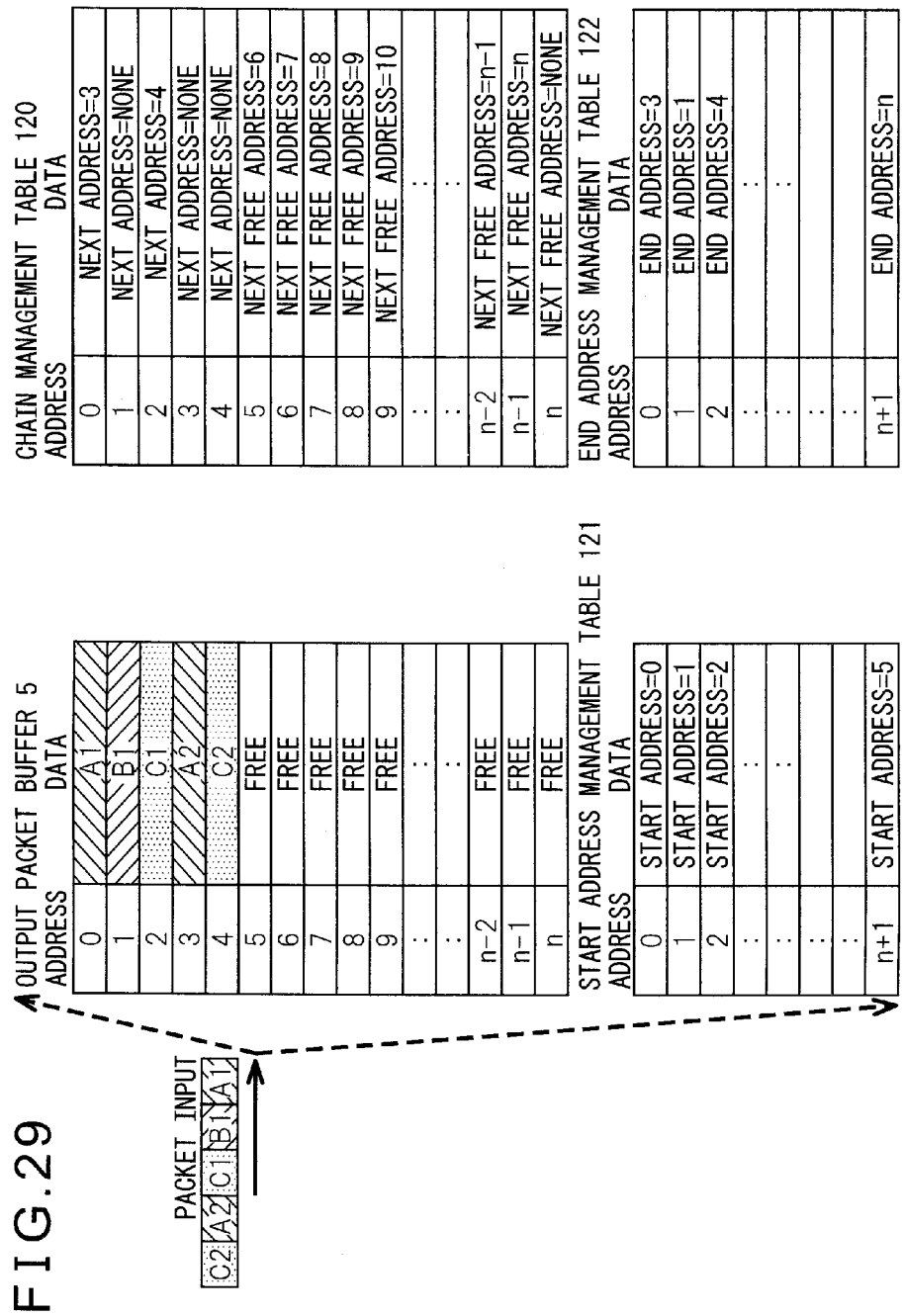
FIG. 29 is an explanatory diagram (part 4) illustrating the state of the output packet buffer and the state of each table at the time of packet reception.

FIG. 29 is an explanatory diagram (part 4) illustrating the state of the output packet buffer and the state of each table at the time of packet reception. The received packet C2 is a packet directed to the physical port P#2. Since the free space start address value stored in the start address management table 121 in FIG. 28 is "4", the packet C2 is stored at address "4" in the output packet buffer 5.

The next address value "4" is stored at address "2" in the chain management table 120. This next address value indicates that the packet C2 that follows the packet C1 stored at address "2" in the output packet buffer 5 is stored at address "4". Since the packet that follows the packet C2 stored at address "4" in the output packet buffer 5 corresponding address "4" in the chain management table 120 is not yet stored, the next address value stored at address "4" in the chain management table 120 has no meaning.

As the packet C2 is written to address "4" in the output packet buffer 5, the free space start address value stored in the start address management table 121 is now "5". Further, as the packet C2 directed to the physical port P#2 is written to address "4" in the output packet buffer 5, the end address value of the outgoing port P#2, stored in the end address management table 122 at address "2" corresponding to the outgoing port P#2, is updated to "4".

Figure 30:
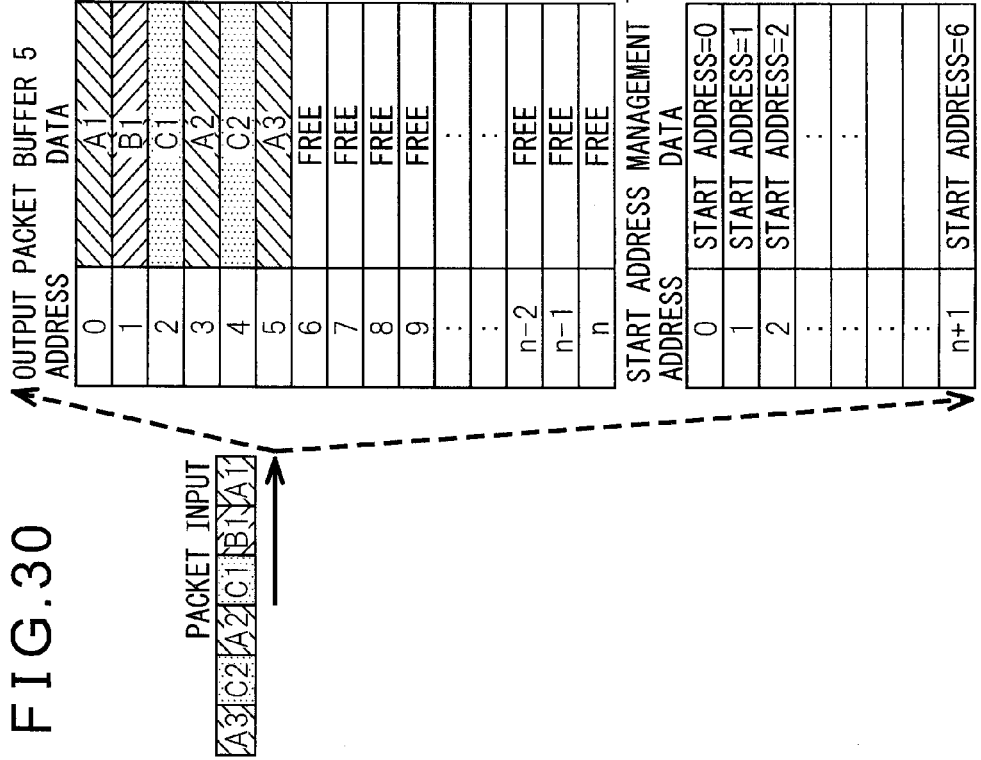
FIG. 30 is an explanatory diagram (part 5) illustrating the state of the output packet buffer and the state of each table at the time of packet reception.

FIG. 30 is an explanatory diagram (part 5) illustrating the state of the output packet buffer and the state of each table at the time of packet reception. The received packet A3 is a packet directed to the physical port P#0. Since the free space start address value stored in the start address management table 121 in FIG. 29 is "5", the packet A3 is stored at address "5" in the output packet buffer 5.

The next address value "5" is stored at address "3" in the chain management table 120. This next address value indicates that the packet A3 that follows the packet A2 stored at address "3" in the output packet buffer 5 is stored at address "5". Since the packet that follows the packet A3 stored at address "5" in the output packet buffer 5 corresponding address "5" in the chain management table 120 is not yet stored, the next address value stored at address "5" in the chain management table 120 has no meaning.

As the packet A3 is written to address "5" in the output packet buffer 5, the free space start address value stored in the start address management table 121 is now "6". Further, as the packet A3 directed to the physical port P#0 is written to address "5" in the output packet buffer 5, the end address value of the outgoing port P#0, stored in the end address management table 122 at address "0" corresponding to the outgoing port P#0, is updated to "5".

Figure 31:
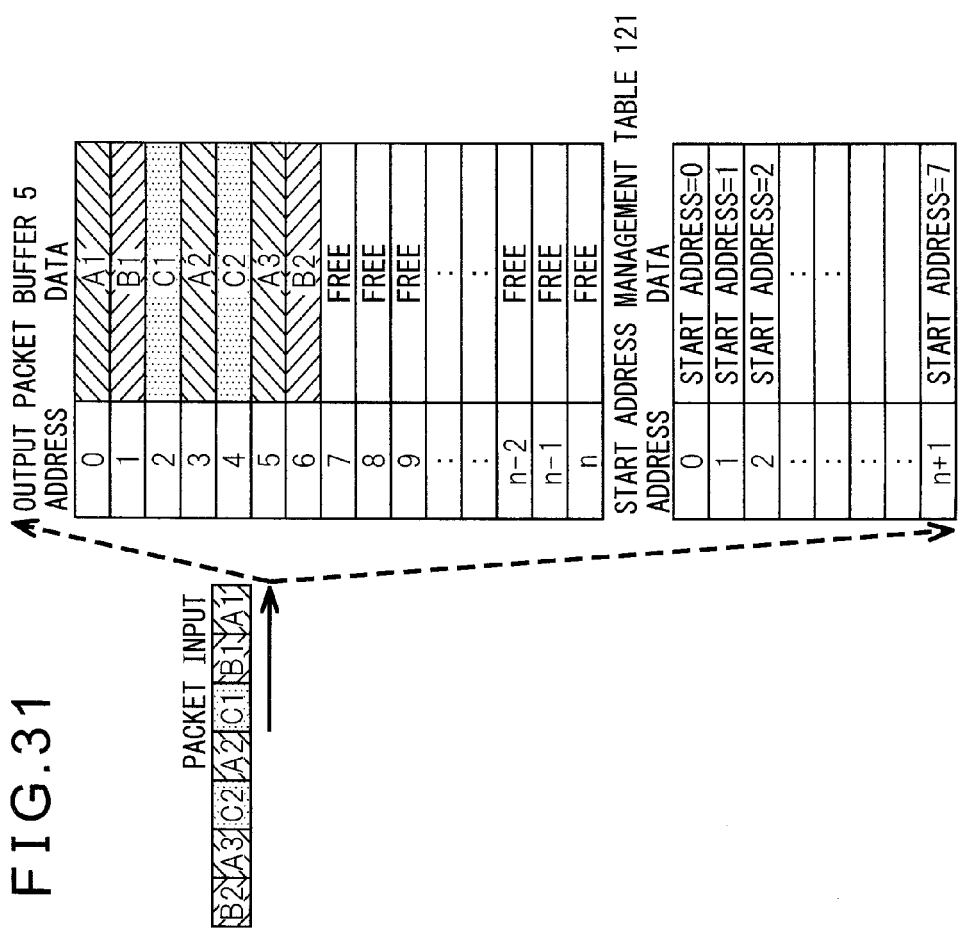
FIG. 31 is an explanatory diagram (part 6) illustrating the state of the output packet buffer and the state of each table at the time of packet reception.

FIG. 31 is an explanatory diagram (part 6) illustrating the state of the output packet buffer and the state of each table at the time of packet reception. The received packet B2 is a packet directed to the physical port P#1. Since the free space start address value stored in the start address management table 121 in FIG. 30 is "6", the packet B2 is stored at address "6" in the output packet buffer 5.

The next address value "6" is stored at address "1" in the chain management table 120. This next address value indicates that the packet B2 that follows the packet B1 stored at address "1" in the output packet buffer 5 is stored at address "6". Since the packet that follows the packet B2 stored at address "6" in the output packet buffer 5 corresponding address "6" in the chain management table 120 is not yet stored, the next address value stored at address "6" in the chain management table 120 has no meaning.

As the packet B2 is written to address "6" in the output packet buffer 5, the free space start address value stored in the start address management table 121 is now "7". Further, as the packet B2 directed to the physical port P#1 is written to address "6" in the output packet buffer 5, the end address value of the outgoing port P#1, stored in the end address management table 122 at address "1" corresponding to the outgoing port P#1, is updated to "6".

Figure 32:
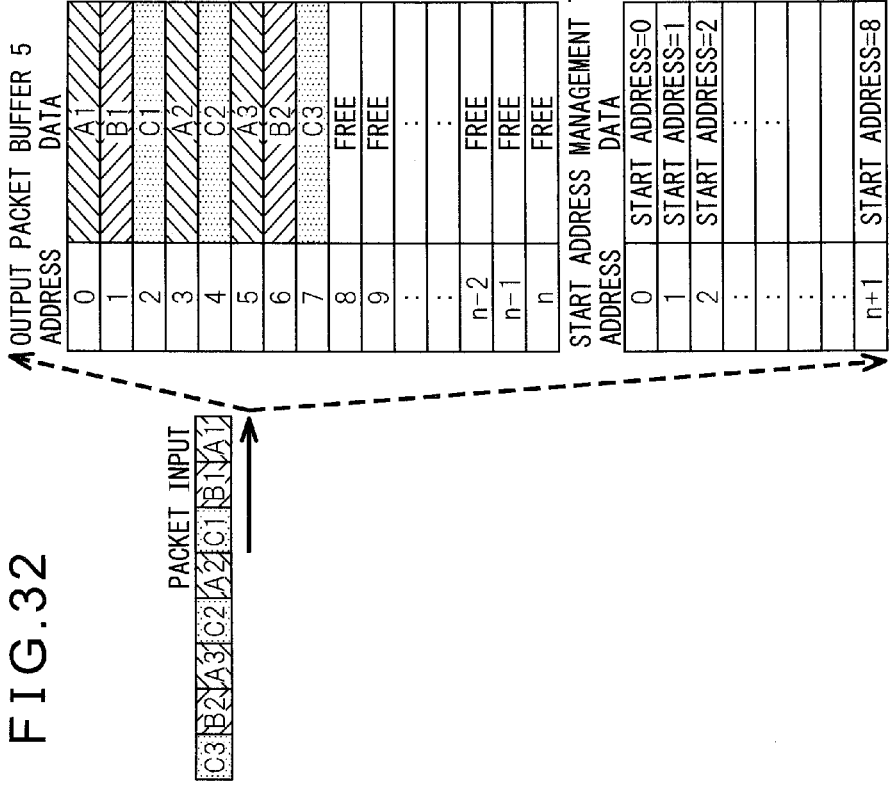
FIG. 32 is an explanatory diagram (part 7) illustrating the state of the output packet buffer and the state of each table at the time of packet reception.

FIG. 32 is an explanatory diagram (part 7) illustrating the state of the output packet buffer and the state of each table at the time of packet reception. The received packet C3 is a packet directed to the physical port P#2. Since the free space start address value stored in the start address management table 121 in FIG. 31 is "7", the packet C3 is stored at address "7" in the output packet buffer 5.

The next address value "7" is stored at address "4" in the chain management table 120. This next address value indicates that the packet C3 that follows the packet C2 stored at address "4" in the output packet buffer 5 is stored at address "7". Since the packet that follows the packet C3 stored at address "7" in the output packet buffer 5 corresponding address "7" in the chain management table 120 is not yet stored, the next address value stored at address "7" in the chain management table 120 has no meaning.

As the packet C3 is written to address "7" in the output packet buffer 5, the free space start address value stored in the start address management table 121 is now "8". Further, as the packet C3 directed to the physical port P#2 is written to address "7" in the output packet buffer 5, the end address value of the outgoing port P#2, stored in the end address management table 122 at address "2" corresponding to the outgoing port P#2, is updated to "7".

Figure 33:
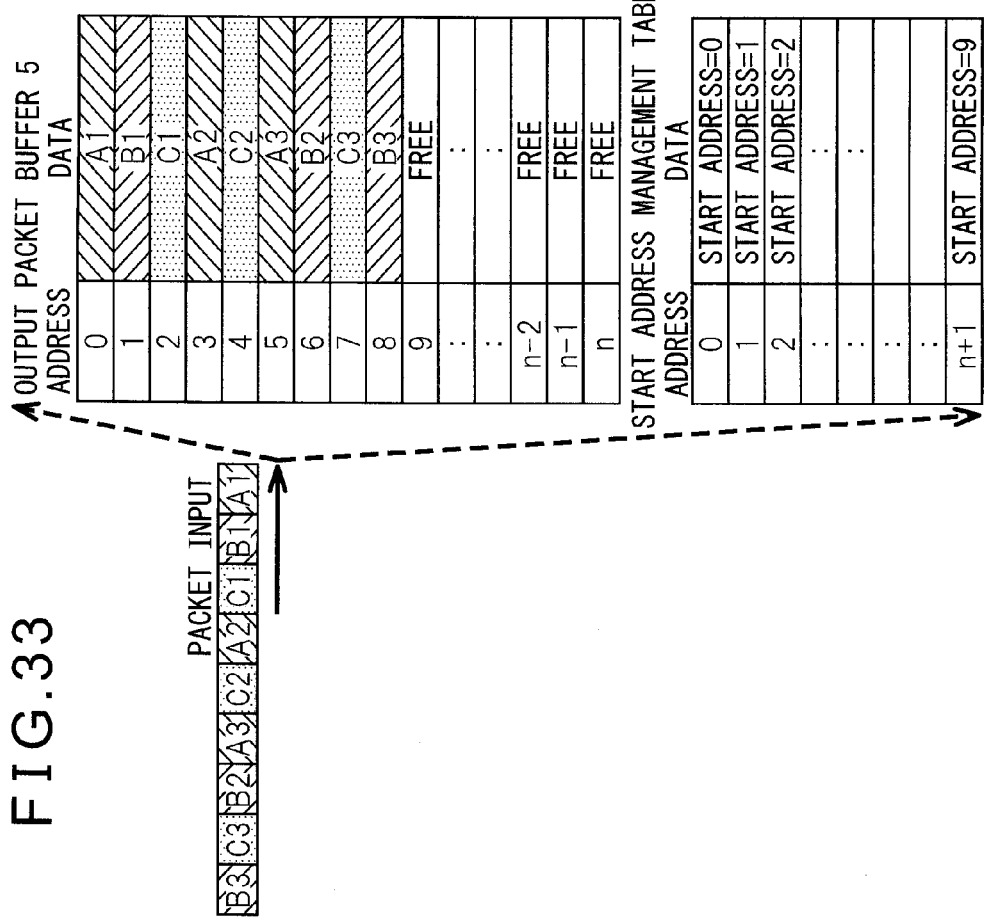
FIG. 33 is an explanatory diagram (part 8) illustrating the state of the output packet buffer and the state of each table at the time of packet reception.

FIG. 33 is an explanatory diagram (part 8) illustrating the state of the output packet buffer and the state of each table at the time of packet reception. The received packet B3 is a packet directed to the physical port P#1. Since the free space start address value stored in the start address management table 121 in FIG. 32 is "8", the packet B3 is stored at address "8" in the output packet buffer 5.

The next address value "8" is stored at address "6" in the chain management table 120. This next address value indicates that the packet B3 that follows the packet B2 stored at address "6" in the output packet buffer 5 is stored at address "8". Since the packet that follows the packet B3 stored at address "8" in the output packet buffer 5 corresponding address "8" in the chain management table 120 is not yet stored, the next address value stored at address "8" in the chain management table 120 has no meaning.

As the packet B3 is written to address "8" in the output packet buffer 5, the free space start address value stored in the start address management table 121 is now "9". Further, as the packet B3 directed to the physical port P#1 is written to address "8" in the output packet buffer 5, the end address value of the outgoing port P#1, stored in the end address management table 122 at address "1" corresponding to the outgoing port P#1, is updated to "8".

Figure 34:
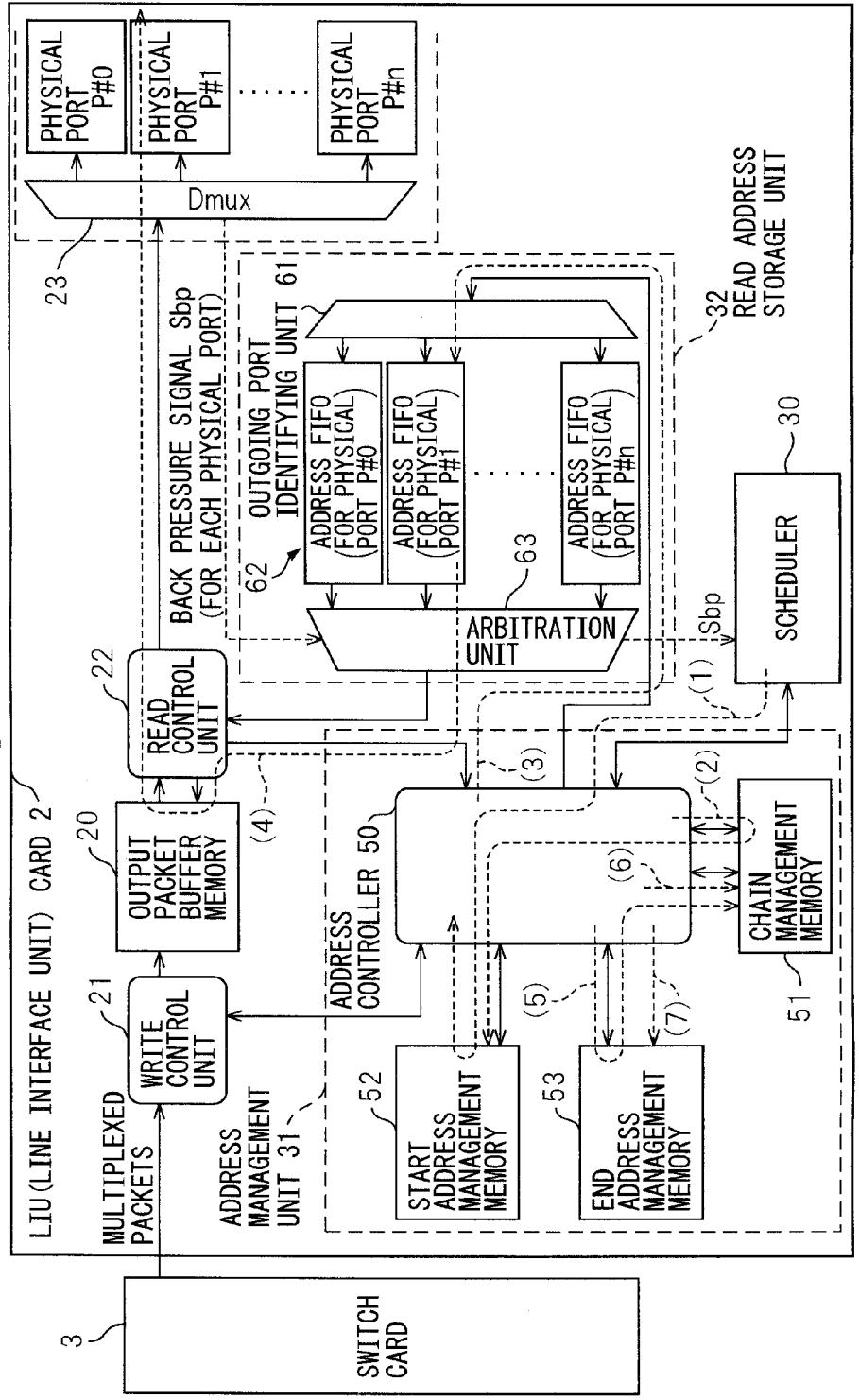
FIG. 34 is an explanatory diagram illustrating the operation of the LIU card at the time of packet transmission.

FIG. 34 is an explanatory diagram illustrating the operation of the LIU card 2 at the time of packet transmission. The signal flows associated with the following operations (1) to (7) are indicated by dashed lines (1) to (7) in FIG. 34.

In operation (1), the scheduler 30 determines the outgoing physical port P for each packet by scheduling. For simplicity, in the following description of FIG. 34, the physical port thus determined by the scheduler 30 will be referred to as the "physical port P#x." The scheduler 30 reports the physical port P#x to the address controller 50. The address controller 50 acquires the start address value of the physical port P#x by reading from the start address management table 121 the contents stored at the address corresponding to the physical port P#x.

In operation (2), the address controller 50 acquires the next address value by reading from the chain management table 120 the contents stored at the address indicated by the start address value of the physical port P#x acquired in operation (1). The address controller 50 writes the thus acquired next address value to the address corresponding to the physical port P#x in the start address management table 121. This updates the start address value of the physical port P#x stored in the start address management table 121.

In operation (3), the address controller 50 supplies the start address value acquired in operation (1) to the read address storage unit 32 as the read address value. The outgoing port identifying unit 61 in the read address storage unit 32 stores the start address value in the address FIFO 62 provided for the physical port P#x.

In operation (4), the read address value stored in the address FIFO 62 is read out of the address FIFO 62 by a read request from the arbitration unit 63. The arbitration unit 63 may determine the address FIFO 62 from which to retrieve the read address value, for example, in accordance with a round robin scheme. The arbitration unit 63 supplies the thus retrieved read address value to the read control unit 22. The read control unit 22 acquires the packet by reading from the output packet buffer 5 the contents stored at the address indicated by the read address value supplied from the arbitration unit 63. The packet is then supplied to the demultiplexer 23 and output from the physical port P#x.

The demultiplexer 23 controls the output of packets in accordance with the actual rate of each physical port P. If a situation occurs, such as a burst, that exceeds the actual rate, the demultiplexer 23 stops the output of packets and sends a back pressure signal Sbp to the arbitration unit 63. In response, the arbitration unit 63 stops reading from the designated port.

In operation (5), the address controller 50 reads the free space end address value from the end address management table 122. The address controller 50 writes the start address value of the physical port P#x acquired in operation (1) to the address in the end address management table 122 pointed to by the free space end address value. With this operation, a chain in which the address value freed by reading the packet in operation (4) is connected as the new free space end address value to the end of the current free space end address value is stored in the chain management table 120.

In operation (6), the address controller 50 writes "next free address=none" to the address in the chain management table 120 pointed to by the start address value of the physical port P#x acquired in operation (1).

In operation (7), the address controller 50 updates the free space end address value by writing the start address value of the physical port P#x acquired in operation (1) to the address "n+1" in the end address management table 122.

Next, referring to FIGS. 35 and 36, a description will be given of how the state of the output packet buffer and the state of each table transition at the time of packet transmission. FIG. 35 is an explanatory diagram (part 1) illustrating the state of the output packet buffer and the state of each table at the time of packet transmission. Here, assume the case where the packet A1 is transmitted from the state illustrated in FIG. 33.

When transmitting the packet A1 directed to the outgoing port P#0 under instruction from the scheduler 30, the address controller 50 reads the start address value "0" of the outgoing port P#0 from the start address management table 121 of FIG. 33 and places it into the address FIFO 62 in the read address storage unit 32.

The arbitration unit 63 supplies the start address value "0" of the outgoing port P#0 to the read control unit 33 by its arbitration operation, whereupon the received packet A1 specified by the start address value "0" of the outgoing port P#0 is read out of the output packet buffer 5.

The address "0" in the output packet buffer 5 from which the packet has been read out becomes free. The contents stored at the address of the current free space end address value "n" in the chain management table 120 are updated to the new free space end address value "0". Further, the value stored at address "0" in the chain management table 120 is updated to "next free address=none."

In the chain management table 120 of the state depicted in FIG. 33, address "3" is specified as the address at which the packet A2 is stored that follows the packet A1 stored at address "0" in the output packet buffer 5. Accordingly, the start address value of the outgoing port P#0 stored in the start address management table 121 is updated to "3".

The free space end address value stored in the end address management table 122 is updated to the new free space end address value "0".

FIG. 36 is an explanatory diagram (part 2) illustrating the state of the output packet buffer and the state of each table at the time of packet transmission. Assume the case where the packet A2 is transmitted from the state illustrated in FIG. 35. The packet A2 is stored at address "3" in the output packet buffer 5. Accordingly, when the packet A2 is read out, the address "3" in the output packet buffer 5 becomes free.

The contents stored at the address of the current free space end address value "0" in the chain management table 120 are updated to the new free space end address value "3". Further, the value stored at address "3" in the chain management table 120 is updated to "next free address=none."

In the chain management table 120 of the state depicted in FIG. 35, address "5" is specified as the address at which the packet A3 is stored that follows the packet A2 stored at address "3" in the output packet buffer 5. Accordingly, the start address value of the outgoing port P#0 stored in the start address management table 121 is updated to "5".

The free space end address value stored in the end address management table 122 is updated to the new free space end address value "3".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A packet transmission apparatus comprising:
    a plurality line interface units; and
    a switch for switching packets between said plurality of line interface units, wherein
    a line interface unit comprises:
    a plurality of communication ports;
    a storage unit which stores a plurality of queues for respectively holding packets to be output from said plurality of communication ports; and
    a stop signal packet generating unit which generates a stop signal packet which is transmitted to another one of said line interface units via said switch, if the amount of packets held in said queue for said one communication port is equal to or larger than a certain first threshold value, and if the sum of the amounts of packets held in said plurality of queues is equal to or larger than a certain second threshold value, wherein said stop signal packet stops said another one of said line interface units from inputting packets directed to one of said communication ports into said switch.

2. The packet transmission apparatus as claimed in claim 1, wherein
    said another one of said line interface units comprises a packet input control unit for controlling the input of packets to said switch, and wherein
    said stop signal packet causes said packet input control unit to stop the packets directed to said one communication port from being input into said switch.

3. The packet transmission apparatus as claimed in claim 1, wherein
    said line interface unit comprises a permit signal packet generating unit which generates a permit signal packet which is transmitted to said another one of said line interface units via said switch, when the amount of packets held in said queue for said one communication port decreases below a certain third threshold value or when the sum of the amounts of packets held in said plurality of queues decreases below a certain fourth threshold value, wherein said permit signal packet permits said another one of said line interface units to input packets directed to one of said communication ports into said switch.

4. The packet transmission apparatus as claimed in claim 3, wherein
    said another one of said line interface units comprises a packet input control unit for controlling the input of packets to said switch, and wherein
    said permit signal packet causes said packet input control unit to permit the packets directed to said one communication port to be input into said switch.

5. A line interface unit which is provided in a packet transmission apparatus having a switch for switching packets between a plurality of lines, and which performs interface control for said packets between said lines and said switch, said line interface unit comprising:
    a plurality of communication ports connected to said plurality of lines;
    a storage unit which stores a plurality of queues for respectively holding packets to be output from said plurality of communication ports; and
    a stop signal packet generating unit which generates a stop signal packet which is transmitted to another line interface unit via said switch, if the amount of packets held in said queue for said one communication port is equal to or larger than a certain first threshold value, and if the sum of the amounts of packets held in said plurality of queues is equal to or larger than a certain second threshold value, wherein said stop signal packet stops said another line interface unit from inputting packets directed to one of said communication ports into said switch.

6. A control method for a packet transmission apparatus, wherein said packet transmission apparatus includes a plurality of line interface units, and a switch for switching packets between said plurality of line interface units, and wherein a line interface unit includes a plurality of communication ports and a storage unit which stores a plurality of queues for respectively holding packets to be output from said plurality of communication ports, said control method comprising;
    comparing the amount of packets held in each of said queues for said communication ports with a certain first threshold value, and comparing the sum of the amounts of packets held in said plurality of queues with a certain second threshold value;
    generating a stop signal packet for stopping another one of said line interface units from inputting packets directed to one of said communication ports into said switch, if the amount of packets held in said queue for said one communication port is equal to or larger than said certain first threshold value, and if the sum of the amounts of packets held in said plurality of queues is equal to or larger than said certain second threshold value; and
    transmitting said stop signal packet to said another one of said line interface units via said switch.

7. The control method for a packet transmission apparatus as claimed in claim 6, further comprising:
    generating a permit signal packet for permitting said another one of said line interface units to input packets directed to one of said communication ports into said switch, when the amount of packets held in said queue for said one communication port decreases below a certain third threshold value or when the sum of the amounts of packets held in said plurality of queues decreases below a certain fourth threshold value; and
    transmitting said permit signal packet to said another one of said line interface units via said switch.

* * * * *